United States Patent
Kojima

(10) Patent No.: US 8,410,974 B2
(45) Date of Patent: Apr. 2, 2013

(54) IMAGE PROCESSING DEVICE, RADAR APPARATUS EQUIPPED WITH THE SAME, METHOD OF PROCESSING IMAGE, AND IMAGE PROCESSING PROGRAM

(75) Inventor: Tatsuya Kojima, Nishinomiya (JP)

(73) Assignee: Furuno Electric Company, Limited, Nishinomiya, Hyogo (JP)

( * ) Notice: Subject to any disclaimer, the term of this patent is extended or adjusted under 35 U.S.C. 154(b) by 291 days.

(21) Appl. No.: 12/879,878

(22) Filed: Sep. 10, 2010

(65) Prior Publication Data
US 2011/0063162 A1    Mar. 17, 2011

(30) Foreign Application Priority Data
Sep. 11, 2009  (JP) .................................. 2009-210973

(51) Int. Cl.
*G01S 13/00*  (2006.01)
(52) U.S. Cl. ............ 342/41; 342/147; 342/176; 342/179
(58) Field of Classification Search ....... 342/25 R–25 F, 342/41, 95–97, 175, 176, 179, 181–183, 342/195
See application file for complete search history.

(56) References Cited

U.S. PATENT DOCUMENTS

| | | | | |
|---|---|---|---|---|
| 3,697,987 A * | 10/1972 | Arthur | ............................ | 342/41 |
| 3,717,873 A * | 2/1973 | Riggs | ............................. | 342/41 |
| 4,224,621 A * | 9/1980 | Cornett et al. | ................ | 342/183 |
| 4,313,115 A * | 1/1982 | O'Sullivan | ...................... | 342/41 |
| 5,307,074 A * | 4/1994 | Janex | ............................. | 342/41 |
| 6,522,289 B1 * | 2/2003 | Frerichs et al. | ............... | 342/176 |
| 7,817,079 B1 * | 10/2010 | Funk | .............................. | 342/41 |
| 7,956,798 B2 * | 6/2011 | Yanagi et al. | ................. | 342/176 |
| 2006/0290562 A1 * | 12/2006 | Ehresman | ...................... | 342/41 |

FOREIGN PATENT DOCUMENTS
JP      2003-48595 A      2/2003

* cited by examiner

*Primary Examiner* — John B Sotomayor
*Assistant Examiner* — Marcus Windrich
(74) *Attorney, Agent, or Firm* — Birch, Stewart, Kolasch & Birch, LLP

(57) ABSTRACT

This disclosure provides an image processing device, which includes an actual trail image memory for storing an actual trail data group indicating absolute changes in position of a target object detected by echo signals obtained corresponding to detection signals transmitted while changing an azimuth direction of the transmission, and a moving target object determination processing module for determining whether the target object detected with the detection signals is a moving target object based on the actual trail data group.

8 Claims, 16 Drawing Sheets

ACTUAL TRAIL IMAGE MEMORY

Fig.13A

MOVEMENT INFORMATION STORING
IMAGE MEMORY
(WHEN FIRST SCAN IS FINISHED)

Fig.13B

MOVEMENT INFORMATION STORING
IMAGE MEMORY
(WHEN FOURTH SCAN IS FINISHED)

IMAGE PROCESSING DEVICE, RADAR APPARATUS EQUIPPED WITH THE SAME, METHOD OF PROCESSING IMAGE, AND IMAGE PROCESSING PROGRAM

CROSS-REFERENCE TO RELATED APPLICATION(S)

The application claims priority under 35 U.S.C. §119 to Japanese Patent Application No. 2009-210973, which was filed on Sep. 11, 2009, the entire disclosure of which is hereby incorporated by reference.

TECHNICAL FIELD

The present invention relates to an image processing device for displaying information based on an obtained echo signal corresponding to a transmitted detection signal, as an image, and to a radar apparatus equipped with the image processing device, a method of processing the image, and an image processing program.

BACKGROUND

For navigation of ships, a method of detecting the presence of target objects around a ship (hereinafter, referred to as a "ship concerned") using a radar apparatus to monitor positional relations between the target objects and the ship concerned is effective for avoiding collisions with other ships. Particularly, the use of the radar apparatus becomes essential in cases of poor visibility such as at nighttime and when dense fog appears. The aforementioned type of radar apparatus may be equipped with an image processing device which displays images by appropriately processing information based on echo signals.

However, if an operator is unfamiliar with the radar images, then there have been cases where it is difficult to determine whether the sources of the echoes on the screen (displayed image showing the target objects) interfere with the navigation. On the other hand, even if the operator is familiar with the radar images, it is difficult to determine the risk of collision unless the operator looks at the screen for at least several scans.

Therefore, a radar apparatus equipped with Automatic Radar Plotting Aids (ARPAs), which assist in the use of the radar apparatus, may be used. The ARPAs have a function to calculate a course of another ship and a time its takes for the another ship to approach the nearest vicinity of the ship concerned based on information such as a relative position and a relative orientation of the ship concerned and the another ship obtained from the radar apparatus in real time. By displaying the calculation results on the screen, the information which is necessary to avoid collisions is provided for the operator so as to be visually easy to understand. JP2003-48595(A) discloses a radar apparatus equipped with this type of ARPAs.

JP2003-48595(A) discloses an other-ship display device configured to display with high visibility for ships having a high risk of collision and low visibility for ships having a low risk of collision. JP2003-48595(A) describes a display device capable of displaying a high visibility image which aids in avoiding collisions, which is the objective of this kind of device.

Further, there is another radar apparatus, which has a so-called trail function to display a current position and a trail (trace of movement) of another ship (target object) on the screen. Conventionally, a relative trail display mode which displays a relative change in position with respect to the ship concerned and an actual trail display mode which displays an absolute change in position, are known as the display modes of the aforementioned trail. In the relative trail display mode, the relative change in position of another ship with respect to the ship concerned is displayed as the trail on the screen. In the actual trail display mode, the actual change in position of the target object with respect to a stationary target object such as land appears on the screen as the trail, regardless of the movement of the ship concerned. The operator selectively uses these trail functions according to the situations and preferences, and uses it to predict the moving directions of other ships or to avoid collisions and the like.

The ARPAs disclosed in JP2003-48595(A) can display an intuitive and easy-to-understand on-screen information to avoid collisions with other ships. However, since technologically advanced processing, such as the acquisition and tracking operations of the target objects, are needed, internal processing becomes complex; thus, leading to large-scale circuits. Therefore, there is room for improvement in terms of lower manufacturing costs.

Further, even when the trail function is displayed, the following problems are present due to the display modes. That is, in the relative trail display mode, the relative change in position of the target object with respect to the ship concerned is configured to be displayed by the trail; therefore, when the ship concerned is moving, even the stationary target objects which are not moving in reality are displayed as the trails. For this reason, it is difficult to determine whether the target object of interest is a moving target object or a stationary target object. In this regard, in the actual trail display mode, since the absolute change in position of the target object is configured to be displayed by the trail, even when the ship concerned is moving, the stationary target object such as land are not displayed as the trail. However, in the actual trail display mode, since the changes in actual position of other ships are displayed, it is difficult for the operator to intuitively determine if other ships are approaching the ship concerned like the relative trail display mode.

SUMMARY

The invention is made in light of the above circumstances and provides an image processing device having a simple configuration that can display a moving target object and a stationary target object so as to distinguish between them, and also provides a radar apparatus equipped with the image processing device, a method of processing the image, and an image processing program.

According to an aspect of the invention, an image processing device includes an actual trail image memory for storing an actual trail data group indicating absolute changes in position of a target object detected by echo signals obtained corresponding to detection signals transmitted while changing an azimuth direction of the transmission, and a moving target object determination processing module for determining whether the target object detected with the detection signals is a moving target object based on the actual trail data group.

In the image processing device, the target object determined to be the moving target object by the moving target object determination processing module may be displayed so as to be distinguished from another target object.

In the image processing device, an actual trail of the target object may be displayed along with the target object based on the actual trail data group.

The image processing device may further includes a relative trail image memory for storing a relative trail data group indicating relative changes in position of the target object corresponding to a transmitted position where the detection signals are transmitted. A relative trail of the target object may be displayed along with the target object based on the relative trail data group.

The actual trail data may be information that is generated per pixel constituting the actual trail image memory and information that varies in a stepwise fashion with the time elapsed immediately after the target object is detected. The moving target object determination processing module may search the actual trail data that has a predetermined value and is stored in the actual trail image memory as a trigger pixel. The moving target object determination processing module may determine, if the actual trail data varies while satisfying a predetermined condition from a pixel position of the trigger pixel in the actual trail image memory to a pixel position corresponding to the actual trail data indicating the presence of the target object, that the pixel position corresponding to the actual trail data indicating the presence of the target object is a pixel position where the moving target object exists.

One of the pixels located at four corners of the actual trail data group expressed by a matrix in the actual trail image memory may be set to a starting pixel. In addition, of the pixels located at the four corners of the actual trail data group, another pixel located diagonal to the starting pixel may be set to an ending pixel. The image processing device may comprise a pixel position calculation module for calculating a position of a detecting pixel where the determination processing of the moving target object is carried out so that a processing row is moved by one row from a row of the starting pixel to a row of the ending pixel, and for each processing row, the detecting pixel is moved by one pixel from a pixel corresponding to the starting pixel in a column direction to a pixel corresponding to the ending pixel in the column direction. The moving target object determination processing module may compare a value of the actual trail data of the detecting pixel with a value of the actual trail data of a comparison pixel that is a pixel around the detecting pixel and has been finished with the determination processing. The moving target object determination processing module may includes a determination data generation module for generating, if the value of the actual trail data of the detecting pixel is identical to the value of the comparison pixel, or if the value of the actual trail data indicates a tendency to approach a value of the actual trail data that indicates the presence of the target object, based on the value of the comparison pixel, determination data according to the value of the actual trail data of the detecting pixel, and a moving target object data determination module for determining, when the determination data becomes the value indicating the presence of the target object, that the pixel position of the detecting pixel is a pixel position where the moving target object exists.

The moving target object determination processing module may carry out the determination processing for all the pixels repeatedly while changing the starting pixel among the pixels at the four corners of the actual trail data group, respectively.

According to another aspect of the invention, a radar apparatus is provided, which is equipped with the image processing device described above.

According to anther aspect of the invention, a method of processing an image includes obtaining echo signals corresponding to detection signals transmitted while changing an azimuth direction of the transmission, storing absolute changes in position of a target object detected by the echo signals as an actual trail data group, and determining whether the target object detected with the detection signals is moving based on the actual trail data group.

According to another aspect of the invention, an image processing program for causing a computer to execute processing is provided. The processing includes obtaining echo signals corresponding to detection signals transmitted while changing an azimuth direction of the transmission, storing absolute changes in position of a target object detected by the echo signals in a memory as an actual trail data group, and determining whether the target object detected with the detection signals is a moving target object based on the actual trail data group stored in the memory.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 13A and 13B are schematic views showing an example distribution of moving target object data corresponding to the example distribution of FIG. 12;

DETAILED DESCRIPTION

Several embodiments according to the invention are described with reference to the appended drawings.

First Embodiment

Figure 1:
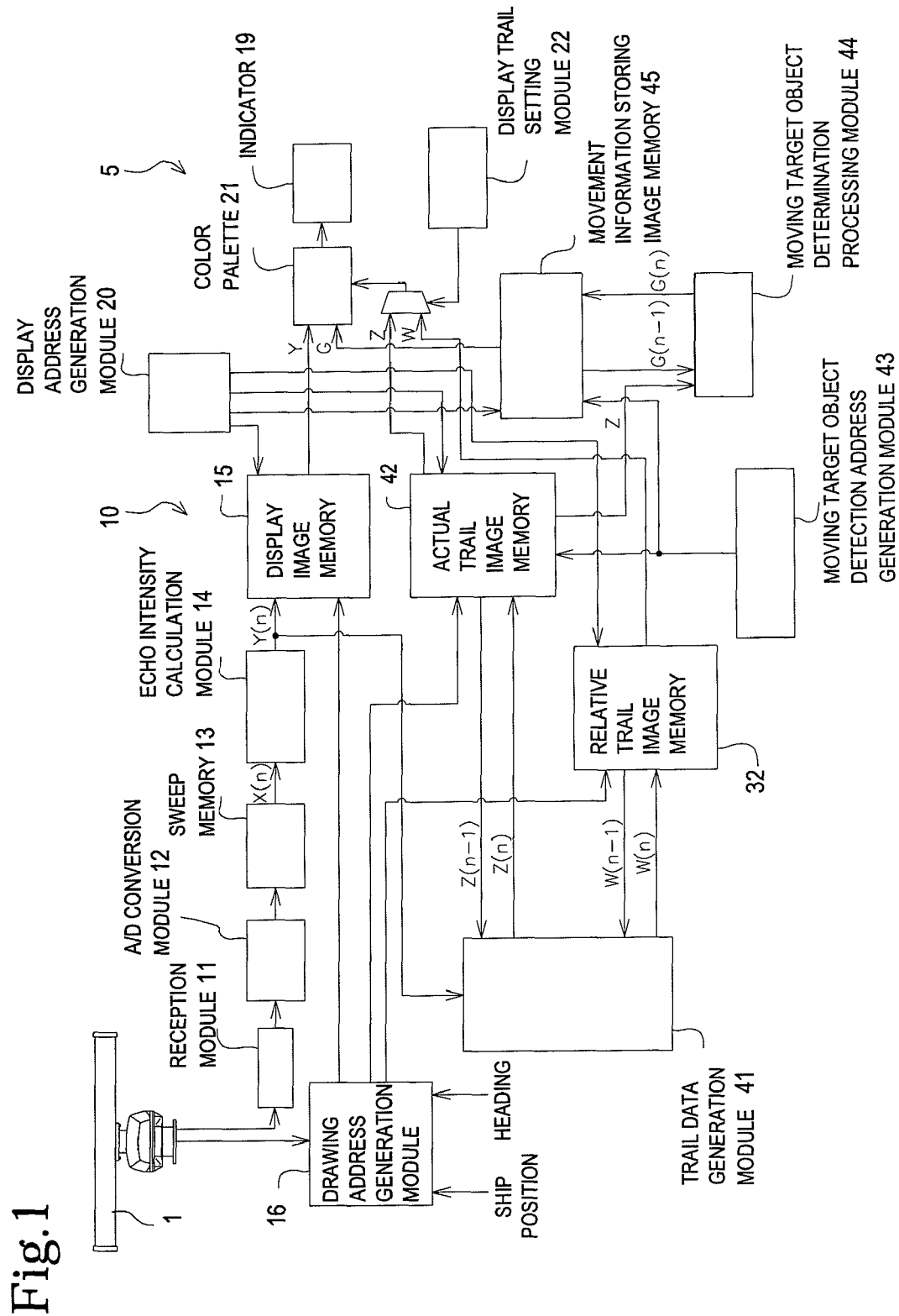
FIG. 1 is a block diagram schematically showing a configuration of a radar apparatus equipped with an image processing device according to a first embodiment of the invention.
Figure 2:
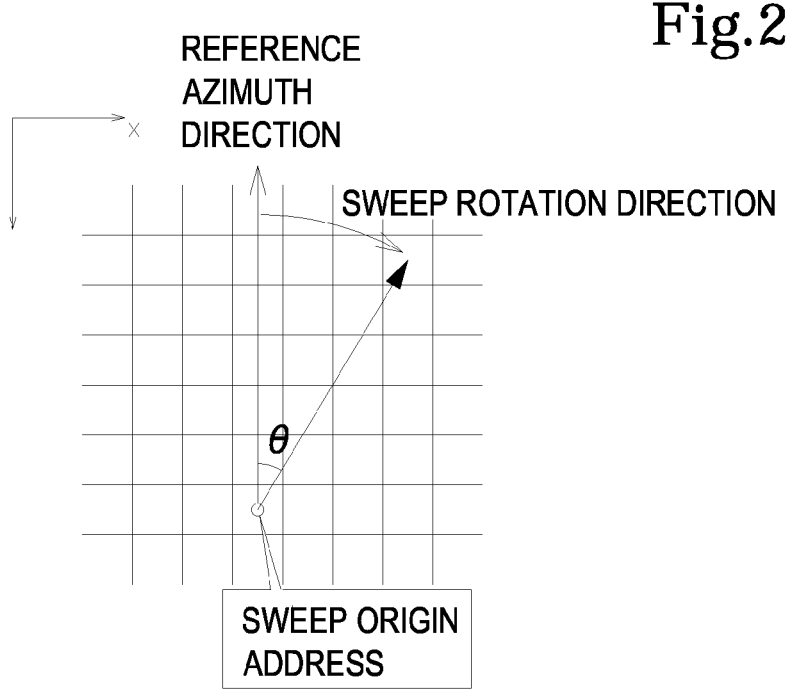
FIG. 2 is a schematic view showing a relation between a reference azimuth direction and a sweep angle.

FIG. 1 is a block diagram schematically showing a configuration of a radar apparatus 5 equipped with an image processing device 10, according to a first embodiment of the invention. FIG. 2 is a schematic diagram showing a relation between a reference azimuth direction and a sweep angle.

The radar apparatus 5 of this embodiment is used as a marine equipment for a ship (hereinafter, referred to as a "ship concerned"). As shown in FIG. 1, the radar apparatus 5 includes a radar antenna 1 and an indicator 19. Further, the radar apparatus 5 includes the image processing device 10 for processing an image. The image processing device 10 includes a reception module 11, an A/D conversion module 12, a sweep memory 13, an echo intensity calculation module 14, a display image memory 15, a drawing address generation module 16, a display address generation module 20, and a color palette 21.

The radar apparatus 5 of this embodiment has a function for displaying trails of other ships (trails of movement of target objects). In order to achieve this function, the image processing device 10 includes a trail data generation module 41, a relative trail image memory 32, an actual trail image memory 42, a moving target object determination processing module 44, a moving target object detection address generation module 43 (pixel position calculation module), and a movement information storing image memory 45.

The image processing device 10 is configured to select either a relative trail display mode or an actual trail display mode as a display mode of the trail. In order to select the display mode, the image processing device 10 includes a display trail setting module 22. The relative trail display mode is a mode where a relative trail which indicates relative changes in the position of another ship with respect to the ship concerned are displayed on the indicator 19. In addition, the actual trail display mode is a mode where an actual trail which indicates absolute changes in the position are displayed on the indicator 19. Note that, in the following description, a target object that shows movement on a display screen of the actual trail display mode is called a "moving target object," and, on the other hand, a target object that does not show movement such as land is called a "stationary target object."

The radar antenna 1 is configured to transmit (radiate) a detection signal which is a pulse-shaped electric wave, and receive an echo signal which is a reflected wave of the transmitted electric wave. The radar antenna 1 rotates at predetermined intervals in a horizontal plane, and the detection signal is transmitted repeatedly at a cycle shorter than the rotation cycle, while changing the azimuth direction of the transmission.

The reception module 11 detects the reflected wave which is received by the radar antenna 1, amplifies it, and then outputs it to the A/D conversion module 12. The A/D conversion module 12 converts the analog signal transmitted from the reception module 11 into an appropriate digital signal.

The sweep memory 13 is configured to store the reception data for one sweep which are converted into the digital signal by the A/D conversion module 12. Note that the term "sweep" as used herein refers to a series of operations from the transmission of the detection signal to the transmission of the next detection signal, and the term "reception data for one sweep" as used herein refers to data which is received between a period after the detection signal is transmitted until the next detection signal is transmitted.

Since electric waves have a property to travel straight, the reception data for one sweep represents a situation laid on a single straight line drawn in a transmitting direction of the radar antenna 1 from the ship-concerned position as a starting point. Note that, when the radar antenna 1 transmits the detection signal in the direction of the straight line, the echo signal caused by the target object closer to the ship concerned is received at a sooner timing, and the echo signal caused by the target object farther from the ship concerned is received at a later timing. Therefore, the reception data for one sweep contains information of whether a target object exists on the straight line and information of a distance to the target object from the ship concerned in a case where there is the target object found on the straight line. The reception data for one sweep can be stored in the sweep memory 13 in chronological order.

The echo intensity calculation module 14 calculates an echo intensity at two or more points set at equal intervals in the reception data by reading the reception data for one sweep in chronological order from the sweep memory 13 and calculating an amplitude sequentially. This is substantially equivalent to detecting the echo intensity of the reflection wave at each of the plurality of set times in which the intervals are spaced at uniform periods of time from the point in time when the detection signal is transmitted from the radar antenna 1.

A group of data of the echo intensities acquired by the echo intensity calculation module 14 (hereinafter, the data group is referred to as an "echo intensity data group for one sweep") are outputted in chronological order to the display image memory 15, and are stored sequentially. Note that which pixels of the image data in the display image memory 15 is the echo intensity data group for one sweep stored is determined by the drawing address generation module 16. Further, in this embodiment, the echo intensity data group for one sweep is transmitted to the trail data generation module 41, and is used to generate the trail data described later.

The display image memory 15 is configured to be capable of storing the image data (raster data) having a plurality of pixel data to display images on the indicator 19. The image held by the display image memory 15 (hereinafter, referred to as a "display image") is implemented by a number of pixels arranged horizontally and vertically in a grid (M×N pixel matrix).

The display image data stored in the display image memory 15 is read out at an appropriate timing and is displayed by the indicator 19. The display image memory 15 can store information on the echo intensity and the like as the above-described pixel data for each pixel.

The drawing address generation module 16 can calculate a pixel position (address) in a corresponding display image for the respective echo intensity data which constitute the echo intensity data group for one sweep which is acquired by the echo intensity calculation module 14. A signal indicating a transmission angle θ of the radar antenna 1 when the detection signal is transmitted is inputted to the drawing address generation module 16. The drawing address generation module 16 calculates the pixel position corresponding to each echo intensity data based on the angle θ of the radar antenna 1 and a radar range by the following method.

That is, when the echo signal returns after a time "t" has elapsed from the time the detection signal was transmitted, it means that the electric wave shuttled a distance "r" between the radar antenna 1 and the target object during the time t. Therefore, if a polar coordinate system with the radar antenna 1 at the origin in a horizontal plane is defined, a position of the target object corresponding to the echo intensity when the time t has elapsed after the radar antenna 1 transmits the detection signal can be represented by (r,θ)=(c×t/2,θ) in the polar coordinate system as the antenna angle from a predetermined azimuth reference (for instance, north) when the detection signal is transmitted being θ. Here, "c" is the speed of light. Further, as shown in FIG. 2, the antenna angle θ in the polar coordinate system is set forth to become 0° when the radar antenna 1 is facing a predetermined azimuth direction (north), and a normal rotating direction of the radar antenna 1 is set forth to become positive. Note that, the drawing address generation module 16 is inputted with information from a GPS sensor and a gyro compass (both are omitted in the drawing) indicating a ship-concerned position and a bow azimuth direction (heading). Alternatively, the predetermined azimuth direction may be assumed as the heading.

Meanwhile, the display image held by the display image memory 15 is represented by the pixels arranged in the grid (matrix) as described above. In this embodiment, the position of each pixel in the display image is herein treated as a position in an X-Y rectangular coordinate system where the upper left corner of the image is assumed to be the origin, the right direction is taken as the X-axis, and the downward direction is taken as the Y-axis.

Then, the drawing address generation module 16 calculates a pixel position in the display image memory 15 where the information of the echo intensity is stored. Specifically, the pixel position (X, Y) is calculated by the following Equations (1) when the ship-concerned position (at the radar antenna 1) is assumed to be (Xs, Ys) in the X-Y rectangular coordinate system.

$$X = Xs + kt \times \sin\theta$$
$$Y = Ys - kt \times \cos\theta \quad (1)$$

Here, "t" is the elapsed time from the time point where the radar antenna 1 transmits the detection signal. "k" is a constant which is determined considering a size of a display area of the indicator 19 and the radar range, and "θ" is the antenna angle. Note that, since (X, Y) specifies the pixel position (address) which constitutes the display image, the fractions of the calculation results of X and Y below the decimal point are rounded appropriately.

In this embodiment, each data which constitutes the echo intensity data group for one sweep is outputted from the echo intensity calculation module 14 to the display image memory 15 in chronological order. Then, the drawing address generation module 16 calculates the pixel position (X, Y) corresponding to the respective echo intensity data sequentially according to the Equations (1), and outputs it to the display image memory 15, respectively. Therefore, when the echo intensity data group for one sweep is processed, the drawing address generation module 16 calculates (X, Y) repeatedly, assuming θ to be constant while increasing t from 0 in the Equations (1).

According to the above-described calculation, the position (X,Y), which represents the pixel in the display image corresponding to the echo intensity data group for one sweep in the X-Y rectangular coordinate system, is located on a straight line of the angle θ with respect to the ship-concerned position (Xs, Ys). Note that, in the following description, the straight line may be called a "sweep line" which represents a straight line formed by the reception data successive in the distance direction obtained from a single detection signal that is transmitted and received.

Therefore, the drawing address generation module 16 has a function to calculate the pixel position (X, Y) in the display image corresponding to a point on the above-described straight line (point on the sweep line). In addition, the drawing address generation module 16 has a function as a coordinate conversion module for converting the point (r, θ) on the sweep line represented by the polar coordinates to the pixel position (X, Y) in the X-Y rectangular coordinate system.

The pixel position (X, Y) obtained as the calculation result by the drawing address generation module 16 moves away gradually from the ship-concerned position (Xs, Ys) with the increase of t from 0, and this trail of movement draws a single straight line (the sweep line). The echo intensity data group for one sweep is stored as pixel data at the calculated pixel position to draw a single sweep line in the display image. Further, an angle of the sweep line changes with the angle θ of the radar antenna 1 each time a single detection signal is transmitted.

Further, the drawing address generation module 16 of this embodiment generates a relative trail address and an actual trail address to write the trail data in the relative trail image memory 32 and the actual trail image memory 42. Details of the relative trail address and the actual trail address are described later.

Note that, in the description hereafter, the storing of the pixel information based on the echo intensity in the relative trail image memory 32 and the actual trail image memory 42 may be expressed as "drawing" in the pixel, The display address generation module 20 generates a display address which is referenced when the image data is read out from the display image memory 15 and displayed on the indicator 19. The image data is read out when requested by the indicator 19. Note that the trail data stored in the relative trail image memory 32 and the actual trail image memory 42 can also be read out by an appropriate module and displayed on the indicator 19.

The color palette 21 stores information for converting the pixel data and the moving target object data of the display image inputted from the display image memory 15 and the movement information storing image memory 45 into color information or brightness information. Further, the color palette 21 stores information on converting the trail data stored in the relative trail image memory 32 and the actual trail image memory 42 into color information or brightness information.

The indicator 19 is a raster-scan type display device constituted by a CRT, an LCD, etc. The display image data read out from the display image memory 15 is displayed by the indicator 19.

In the radar apparatus 5 which is configured as described above, the echo intensity calculation module 14 obtains the echo intensity data group for one sweep based on the echo signals when the detection signals are transmitted from the radar antenna 1. Further, the drawing address generation module 16 sequentially calculates the plurality of pixel positions (in the X-Y rectangular coordinate system) to store the echo intensity data group for one sweep in the display image memory 15 based on the angle θ of the radar antenna 1 when the detection signal is transmitted.

Then, based on the results described above, each data constituting the echo intensity data group is stored in the display image memory 15 as pixel data, as if the sweep line at the angle θ is drawn in the display image held by the display image memory 15. By repeating the above-described processing while changing the angle θ of the radar antenna 1 gradually, one sweep line can be drawn at a time in the display image data of the display image memory 15, with respect to the ship-concerned position.

The image data obtained in such a manner is read out from the display image memory 15 at an appropriate timing, and after appropriate synthetic processing with other images and the like is performed, the image data is then displayed on the indicator 19. As a result, an image with a number of sweep lines radially drawn is displayed on the indicator 19, and a user can know a positional relation between the ship concerned and the surrounding target objects by viewing the image. With the rotation of the radar antenna 1, new sweep lines are repeatedly drawn in the image of the display image memory 15, and as a result, the image displayed on the indicator 19 is updated from time to time.

The trail data generation module 41 generates the trail data based on the echo intensity data of one pixel (hereinafter, this data is referred to as an "echo data Y") which is inputted from the echo intensity calculation module 14. Pixel information, which determines a darkness of the image displayed in the screen image, is set to the trail data (intensity, or color tone or shade to exaggerate the trail data). Here, in this embodiment, the pixel information is represented by 8 bits (256 tones).

For example, the pixel information is set so that, when a target object has just passed the pixel, the trail is displayed darker (more intensity, or darker color tone or shade to exaggerate the trail) on the screen. On the other hand, when a long period of time has lapsed after the target object has passed the pixel, the pixel information is set so that the trail is displayed lighter (less intensity, or less color tone or shade to not exaggerate the trail) on the screen. The trail data generated by the trail data generation module 41 in such a manner is transmitted to the relative trail image memory 32 as relative trail data W as well as to the actual trail image memory 42 as actual trail data Z.

The relative trail image memory 32 is a memory constituted by an SDRAM or the like, which can store a plurality of relative trail data W (relative trail data group) obtained during one rotation of the radar antenna 1. The trail data generated by the trail data generation module 41 is written in the relative trail image memory 32 according to the relative trail address generated by the drawing address generation module 16. The drawing address generation module 16 determines the relative trail address of the trail data so as to fix the ship-concerned position in the relative trail image memory 32. Therefore, the trail data is written at the address corresponding to the target object position with respect to the ship-concerned position, regardless of whether the ship concerned is moving or not (without considering a traveling distance of the ship concerned). As a result, the trail data is stored in the relative trail image memory 32 as the relative trail data W which is a distance-based synthesis between the ship concerned and another ship (represents relative changes in position of another ship with respect to the ship concerned). A relative trail is displayed on the screen based on the plurality of relative trail data W (relative trail data group) stored in the relative trail image memory 32.

The actual trail image memory 42 is a memory constituted by an SDRAM or the like, which can store a plurality of actual trail data Z (actual trail data group) obtained during one rotation of the radar antenna 1. The trail data generated by the trail data generation module 41 is written in the actual trail image memory 42 according to the actual trail address generated by the drawing address generation module 16. The drawing address generation module 16 determines the actual trail address of the trail data considering the traveling distance of the ship concerned. More specifically, the actual trail address is obtained by adding the traveling distance of the ship concerned to the relative trail address by an appropriate method. The trail data is stored in the actual trail image memory 42 by the actual trail address as the actual trail data Z indicating the changes in absolute position of another ship. An actual trail is displayed on the screen based on the actual trail data group stored in the actual trail image memory 42. Since the traveling distance of the ship concerned is considered in the actual trail display mode, the trails of stationary target objects such as land and the like are not displayed like the relative trail display mode.

Figure 3:
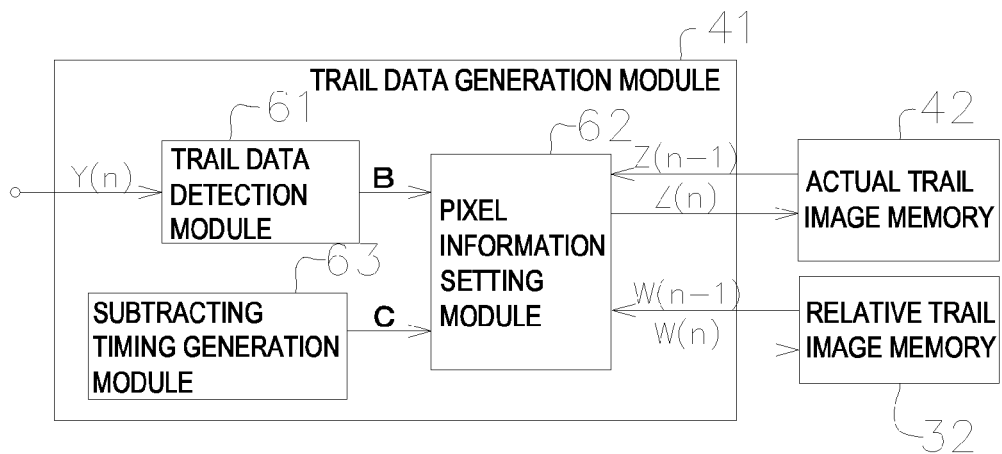
FIG. 3 is a block diagram showing a configuration of a trail data generation module.
Figure 4:
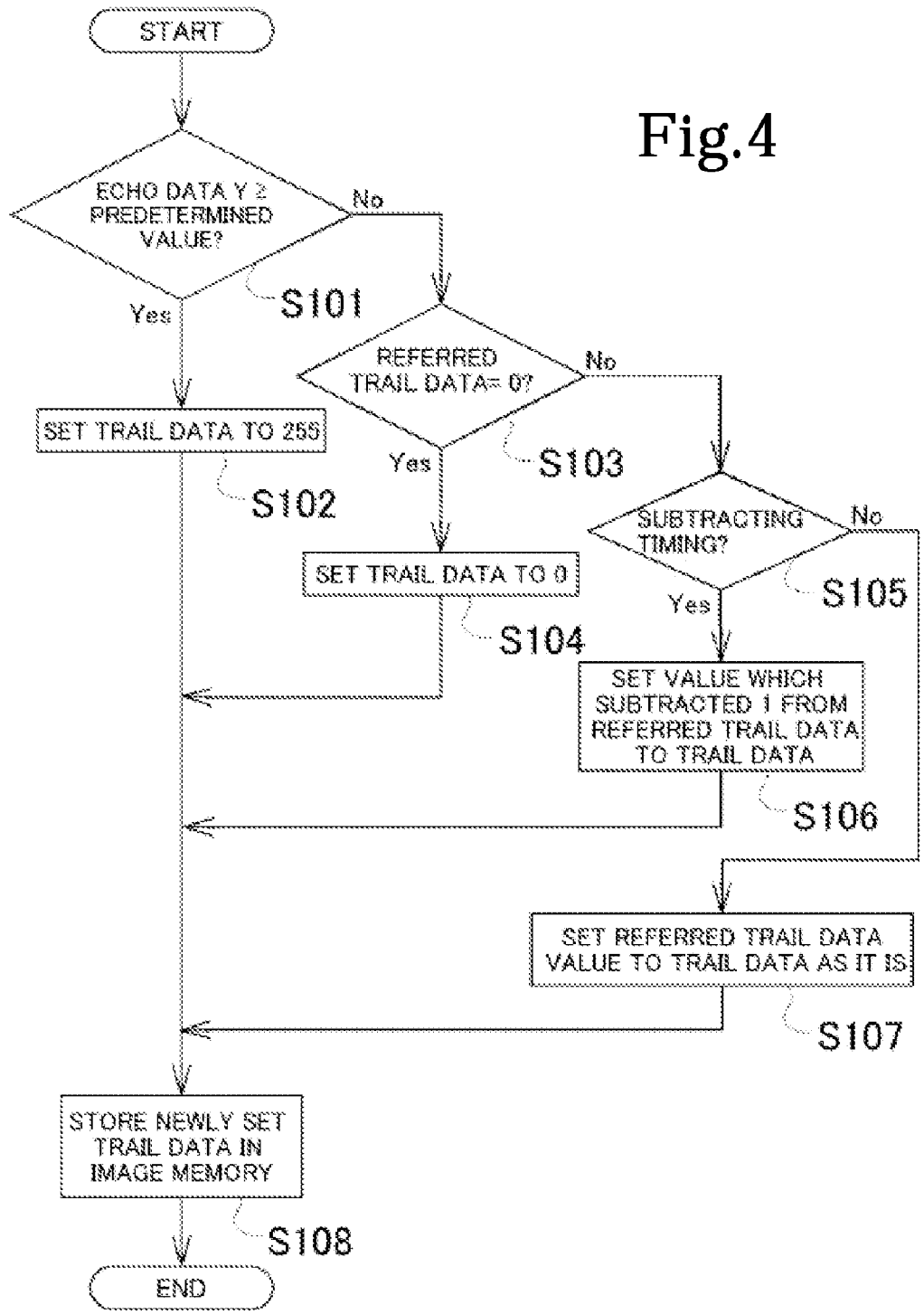
FIG. 4 is a flowchart showing processing for generating trail data based on echo data.
Figure 5:
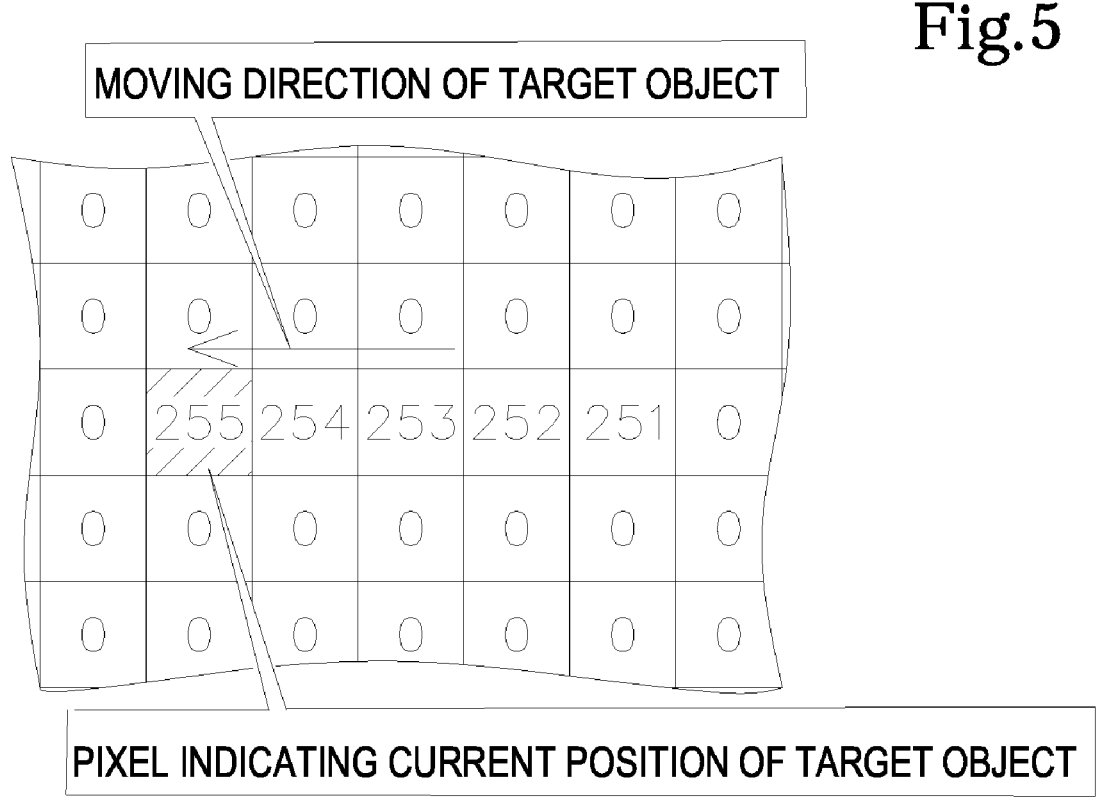
FIG. 5 is schematic diagram showing an example distribution of the trail data.

Next, the processing for generating the trail data is described with reference to FIGS. 3 to 5. FIG. 3 is a block diagram showing a configuration of the trail data generation module 41. FIG. 4 is a flowchart showing processing for generating the trail data based on the echo data Y. FIG. 5 is a schematic diagram showing an example distribution of the trail data.

As shown in FIG. 3, the trail data generation module 41 includes a trail data detection module 61, a pixel information setting module 62, and a subtracting timing generation module 63, as substantial components thereof.

The trail data detection module 61 is used for checking the existence of the target object within the pixel being processed, based on the echo data Y which is inputted from the echo intensity calculation module 14. A value "A" is set as a threshold in the trail data detection module 61, where the existence of the target object is determined by comparing the set value A and a value of the echo data Y. More specifically, when the echo data Y is greater than the set value A, the trail data detection module 61 transmits a determination signal B (B=1), which indicates the existence of the target object in the pixel, to the pixel information setting module 62. When the value of the echo data Y is less than the set value A, the trail data detection module 61 transmits the determination signal B (B=0), which indicates the non-existence of the target object in the pixel, to the pixel information setting module 62.

The pixel information setting module 62 generates the trail data which becomes the base of the actual trail data Z and the relative trail data W. The value of the trail data corresponding to the elapsed time is set by the pixel information setting module 62. The value of the trail data is set to a value corresponding to the elapsed time by being subtracted at regular intervals.

The subtracting timing generation module 63 determines the timing for subtracting the value of the trail data, and transmits a timing signal C to the pixel information setting module 62. The subtracting timing generation module 63 transmits the timing signal C=1 only during one sweep made by the radar antenna 1 for each of the predetermined cycles, and transmits the timing signal C=0 at all other times. When the timing signal value is 1 and a predetermined condition is satisfied, the trail data generation module 41 subtracts the value of the trail data.

The new trail data is generated sequentially by this configuration using the processing for each pixel. Specifically, when the pixel information setting module 62 receives the determination signal B=1 from the trail data detection module 61, the predetermined value which indicates the existence of the target object in the corresponding pixel is set as the trail data. Here, the pixel information described above is stored as 8 bits integer value data (256 tones of 0 to 255) in this embodiment, and the predetermined value described above which indicates the existence of the target object is 255. Therefore, 255 is written as the trail data in the pixel which is determined to be the existence of the target object. On the other hand, when the determination signal B=0 is received and the actual trail data Z is to be calculated, the new actual trail data Z(n) is calculated based on the actual trail data Z(n−1) of the past obtained from the actual trail image memory 42, and the actual trail data Z(n) is written in the actual trail image memory 42. Similarly for the relative trail data W, when the determination signal B=0 is received, the new relative trail data W(n) is calculated based on the relative trail data W(n−1) of the past obtained based on the relative trail image memory 32, and the relative trail data W(n) is written in the relative trail image memory 32.

Next, the generation of the trail data is described with reference to the flowchart of FIG. 4. In the following description, the generation of the actual trail data Z is described as an example. The flow shown in FIG. 4 begins when the echo data Y is inputted from the echo intensity calculation module 14 to the trail data generation module 41. First, the trail data detection module 61 checks if the echo data Y is greater than the set value A and then transmits the determination result to the pixel information setting module 62 (S101).

When the pixel information setting module 62 receives the determination signal B (B=1) which indicates that the echo data Y is greater than the set value A, it sets the actual trail data Z(n) to the maximum value of 255 (S102). On the other hand, when the pixel information setting module 62 receives the determination signal B (B=0) which indicates the echo data Y is less than the set value A, it refers the actual trail data Z(n−1) of the past stored in the actual trail image memory 42 and checks whether the value is 0 (S103).

When the actual trail data Z(n−1) of the past referred at S103 is 0, the pixel information setting module 62 sets the value of 0 as the new actual trail data Z(n) (S104). On the other hand, when the actual trail data Z(n−1) of the past referred at the processing of S103 is not 0, the pixel information setting module 62 checks whether it is the subtracting timing of the value of the actual trail data Z(n−1) based on the timing signal C (S105).

When it is the subtracting timing (C=1) of the value of the actual trail data Z(n−1), the pixel information setting module 62 sets a value derived by subtracting 1 from the referred actual trail data Z(n−1) of the past to the new actual trail data Z(n) (S106). As a result, the value of the pixel information changes only by one tone. For instance, when the value of the referred actual trail data Z(n−1) of the past is 255, the newly setting value of the actual trail data Z(n) will be 254. On the other hand, when it is not the subtracting timing (C=0), the pixel information setting module 62 sets the referred value of the actual trail data Z(n−1) of the past to the actual data Z(n) as it is, without changing the value (S107).

The pixel information setting module 62 stores the actual trail data Z(n) which is set using any one of the processing of S102, S104, S106 and S107 in the actual trail image memory 42 in accordance with the actual trail address described above (S108). The trail data generation module 41 carries out the above-described processing for every pixel and then stores the actual trail data Z (actual trail data group) for one full screen obtained during one rotation of the radar antenna 1 in the actual trail image memory 42.

The relative trail data W can be obtained from processing similar to the flowchart of FIG. 4. When the relative trail data W is to be processed, all the processing are similar except for the point where the address generated by the drawing address generation module 16 is the relative trail address and the point where the relative trail data W(n−1) of the past, which is referred during the generation of the new relative trail data W(n), is read out from the relative trail image memory 32. The relative trail data W obtained during one rotation of the radar antenna 1 (relative trail data group) can be stored in the relative trail image memory 32 by repeating the above-described processing for every pixel.

FIG. 5 is a schematic diagram showing the example distribution of the actual trail data Z which is stored in the actual trail image memory 42. As described above, in the pixel where the target object is currently present, the pixel information value is set to 255. The values between 254 and 251 shown in FIG. 5 are data representing the trail. Further, the pixels in which the actual trail data Z are set to 0 indicate that the target object was not present within the predetermined time. In FIG. 5, the pixel information value of the actual trail data Z decreases by one each time advancing to the pixel on the right side from the pixel currently showing the target object. Thus, it is understood that with every one cycle of the subtracting timing, the target object advances to the left side on the screen by one pixel at a time.

Next, the detection processing of the moving target by the moving target detection processing module 44 shown in FIG. 1 will be described. Note that the following detection processing of the moving target object is carried out independent of the sweep line drawing processing described above.

The moving target detection processing module 44 searches a trigger pixel among the actual trail data group stored in the actual trail image memory 42 and then determines the target object as the moving target object when a series of pixels from the trigger pixel to the pixel where the target object exists satisfy a predetermined condition. The pixel position (address) considered as a target for the processing of the moving target detection processing module 44 is generated by the moving target object detection address generation module 43.

Figure 6:
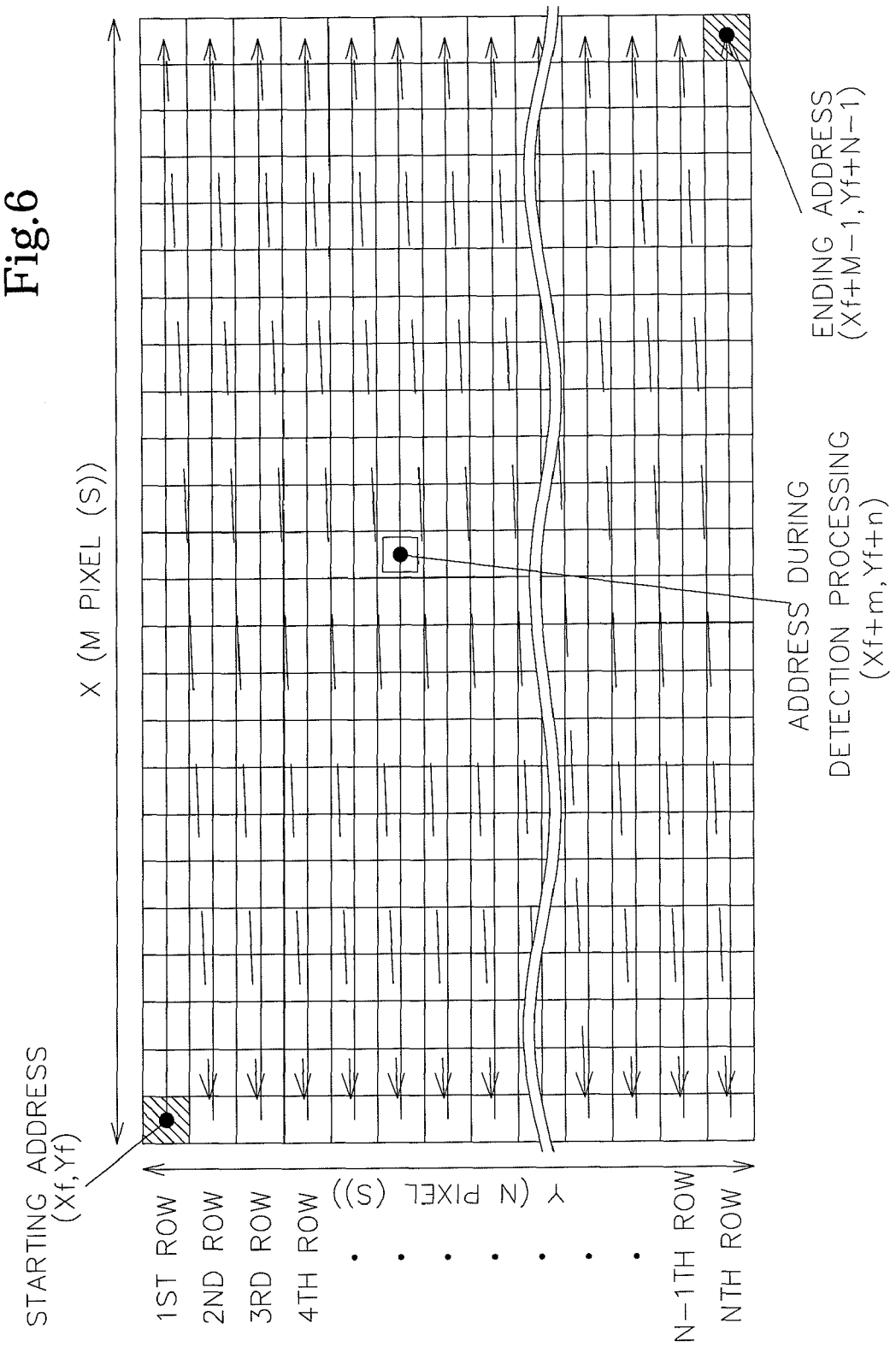
FIG. 6 is a schematic diagram showing detection processing according to an address determined by a moving target object detection address generation module.
Figure 7:
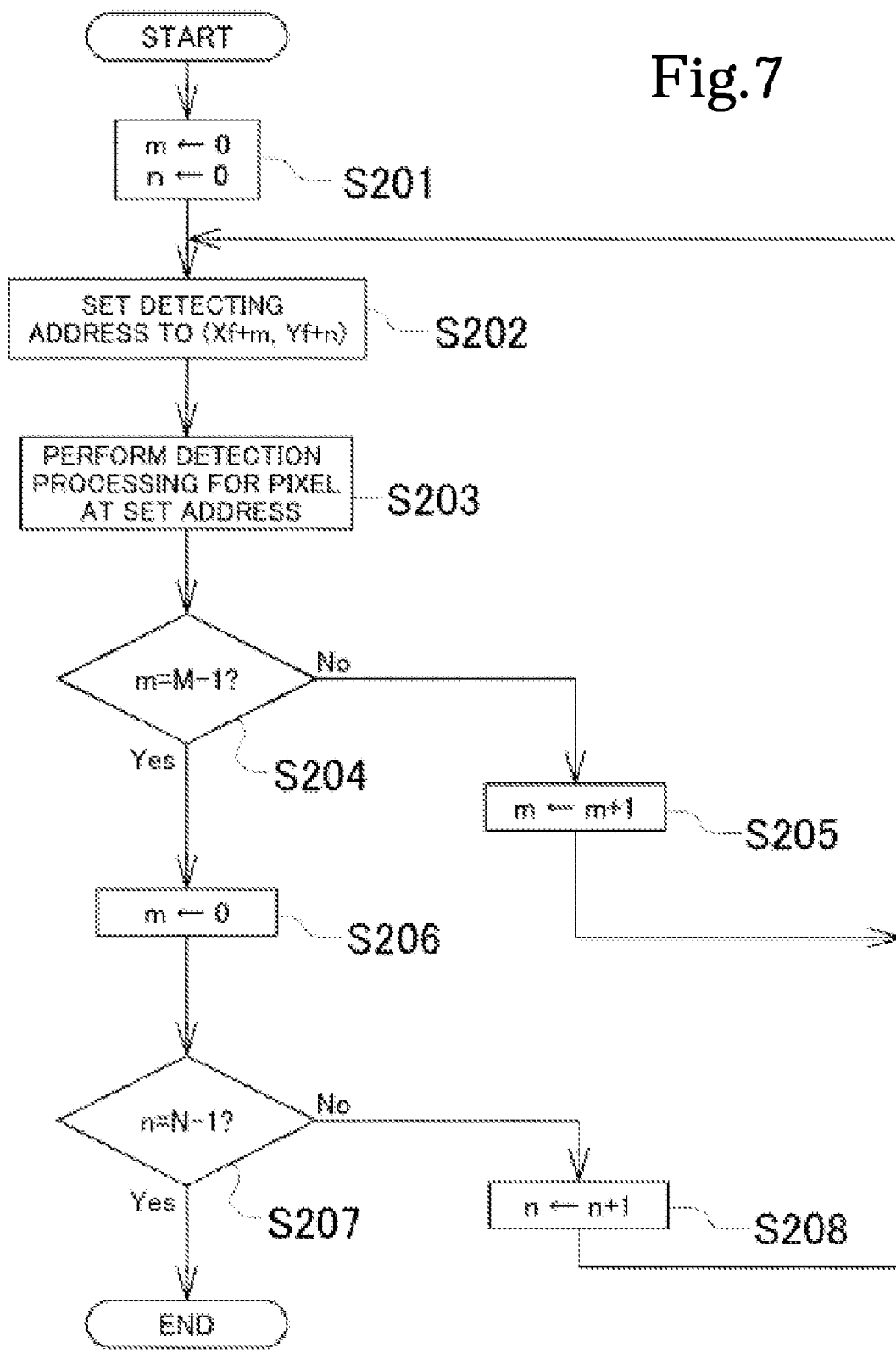
FIG. 7 is a flowchart showing processing for generating the address by the moving target object detection address generation module.

First, the determination of the pixel position to be detected will be described with reference to FIGS. 6 and 7. FIG. 6 is a schematic diagram showing the detection processing in accordance with the address determined by the moving target object detection address generation module 43. FIG. 7 is a flowchart showing the processing for generating the address by the moving target object detection address generation module 43.

The moving target object detection address generation module 43 is sequentially determined to specify all pixels stored in the actual trail image memory 42. First, the starting address of a starting pixel at which the detection processing is started is set and the ending address of an ending pixel at which the detection processing is terminated is set in the moving target object detection address generation module 43. The starting pixel is set to one of the pixels arranged on four corners of the actual trail data group in the actual trail image memory 42. Of the pixels arranged on the four corners, the ending pixel is set to a pixel located at a diagonal position from the starting pixel. Note that, as shown in FIG. 6, since the processing is carried out sequentially from the starting pixel to the ending pixel in this embodiment, the starting pixel side is called an "upstream side" and the ending pixel side is called a "downstream side" in the following description, focusing on the flow of this processing.

In the example shown in FIG. 6, the starting pixel is set to the upper left corner pixel and the ending pixel is set to the lower right corner pixel in the actual trail image memory 42 where the M×N pixels are arranged in the X-Y rectangular coordinate system. As shown in the example of FIG. 6, the address of the starting pixel is $(Xf, Yf)$ and the address of the ending pixel is $(Xf+M-1, Yf+N-1)$. When the variables "m" $(M>m \geqq 0)$ and "n" $(N>n \geqq 0)$ are used in this configuration, the pixel address in the detection processing can be represented by $(Xf+m, Yf+n)$. The starting pixel belongs to the first line, and the ending pixel belongs to Nth line. The term "line" as used herein means a horizontal line (direction parallel to the X-axis).

The detection processing is described in detail with reference to FIG. 7. When the trigger pixel detection processing starts, the variable m and the variable n which determine the address are set to 0, respectively (S201). Next, the moving target object detection address generation module 43 determines the address (X, Y) of the pixel for which the detection processing is carried out, according to X=Xf+m and Y=Yf+n (S202). For example, in the first-time processing, since m=0 and n=0 are set, the initially set address becomes (Xf, Yf) and it matches with the address of the starting pixel. Next, the detection processing is carried out for the pixel at the address set by the processing at S202 (S203).

Next, the detection processing checks if m=M−1 (S204), and if m≠M−1, then 1 is added to the value of m (S205) and the processing returns to S202. If m=M−1, since the pixel for which the detection processing was carried out at S203 is the pixel at the right end, the value of m is set to 0 (S206). Then, in order to determine if the pixel for which the detection processing was carried out is at the ending address, the detection processing checks if n=N−1 (S207). If n≠N−1, since it is not at the ending pixel, "1" is added to the value of n (S208) and the processing returns to S202. From the determination obtained from S207, if it is determined that the ending address is reached (n=N−1), then this processing is terminated.

According to the flowchart described above, the detection processing at S203 is repeated sequentially for pixel by pixel until the detection processing reaches the ending pixel from the starting pixel. As a result, the actual trail data Z of all the pixels which are stored in the actual trail image memory 42 will be processed.

Figure 8:
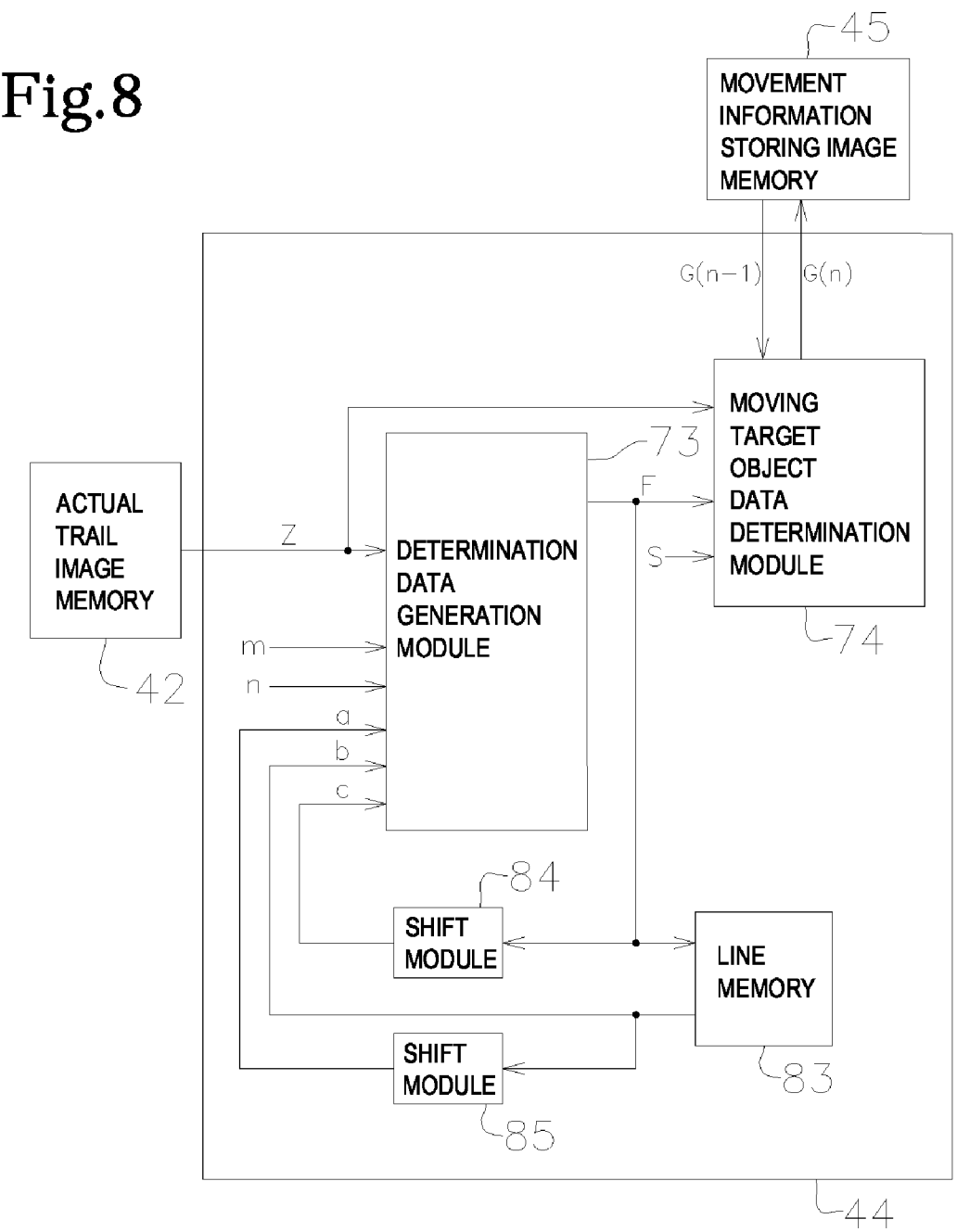
FIG. 8 is a block diagram showing a configuration of the moving target object determination processing module.
Figure 9:
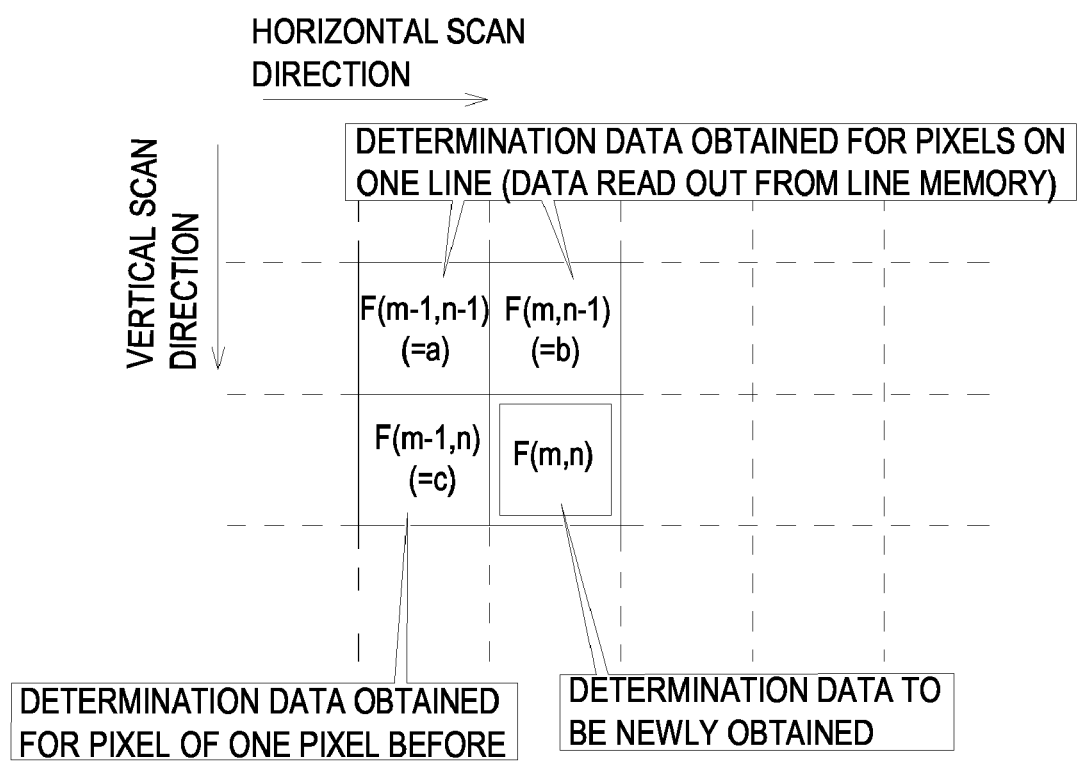
FIG. 9 is a schematic diagram showing a positional relation between a pixel to be used for comparison and a pixel under detection processing, in actual trail detection processing.
Figure 10:
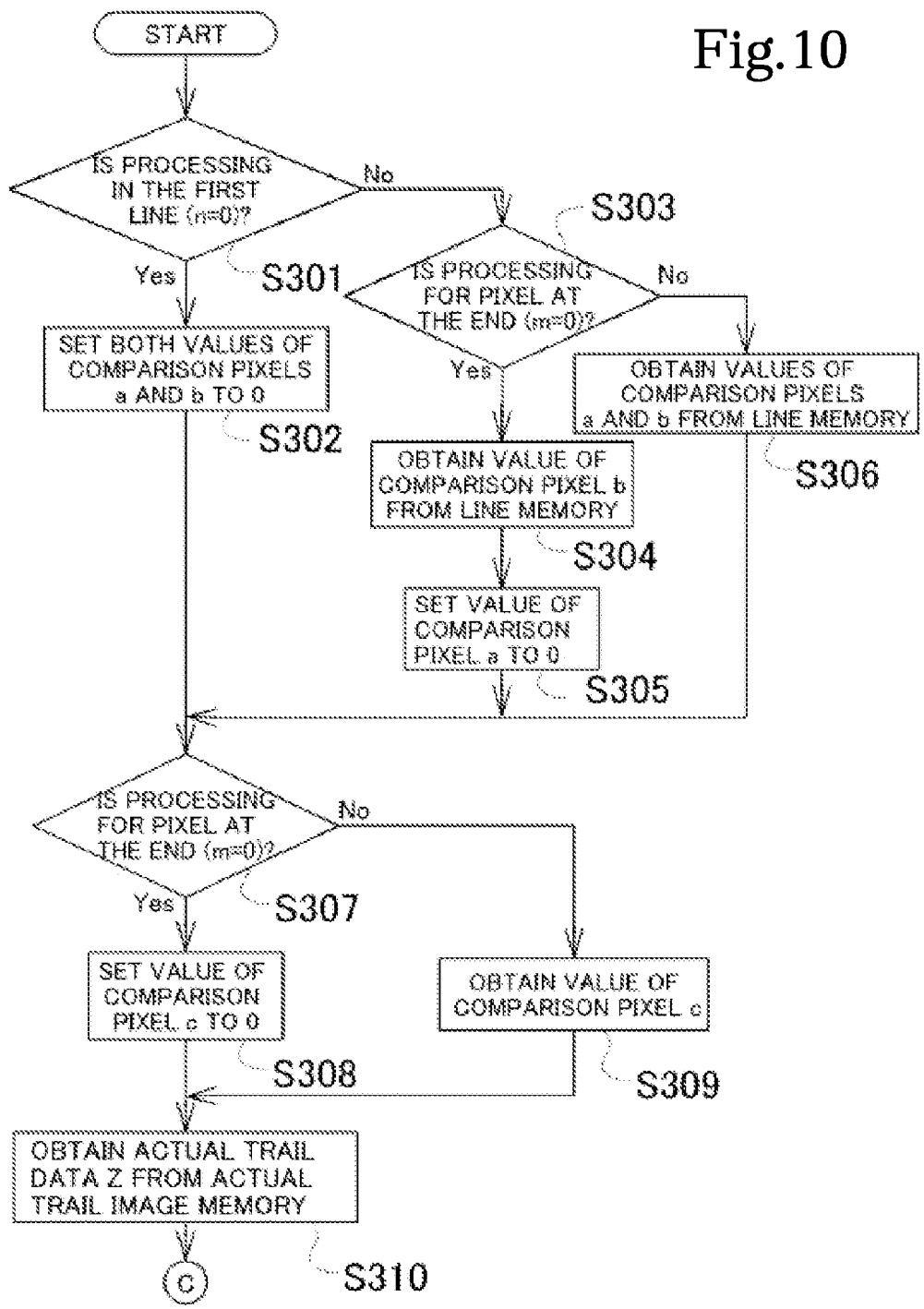
FIG. 10 is a flowchart showing the first half of processing for detecting a position of a target object performed by the moving target object detection processing module.
Figure 11:
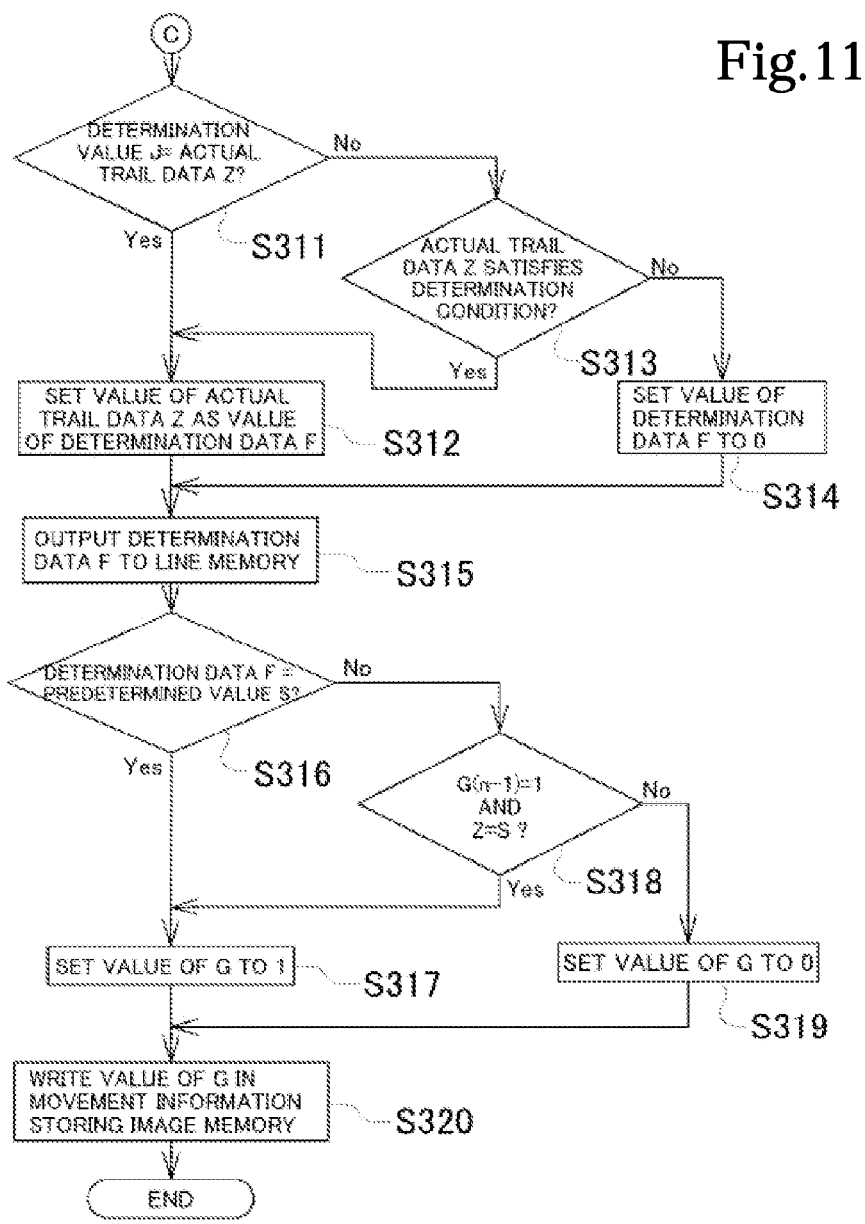
FIG. 11 is a flowchart showing the second half of the processing for detecting the position of the target object performed by the moving target object detection processing module.

Next, the content of the detection processing by the moving target object determination processing module 44 is described with reference to FIGS. 8 to 15. FIG. 8 is a block diagram showing a configuration of the moving target object determination processing module 44. FIG. 9 is a schematic diagram showing positional relations between comparison pixels a, b and c, and a pixel for which the detection processing is currently carried out. FIGS. 10 and 11 are flowcharts showing the detection processing of the moving target by the moving target object determination processing module 44.

As shown in FIG. 8, the moving target object determination processing module 44 includes a determination data generation module 73, a moving target object data determination module 74, a line memory 83, and two shift modules 84 and 85, as its substantial components.

The determination data generation module 73 generates determination data F for determining that the moving target object is detected by the moving target object data determination module 74. To the determination data generation module 73, the actual trail data Z is inputted from the actual trail image memory 42, and the variables m and n (refer to FIG. 6) for specifying the address of the pixel for which the detection processing is carried out are inputted. Note that the pixel for which the detection processing is carried out (pixel specified by the values of m and n) may be called a "detecting pixel" in the following description.

To the determination data generation module 73, values of the determination data F for determining the comparison pixels a, b and c which are located near the detecting pixel are inputted, respectively. The positional relations between the detecting pixel and the comparison pixels a, b and c are described by using FIG. 9. Note that FIG. 9 shows the positional relations between the detecting pixel and the comparison pixels when the starting pixel is set to the pixel at the upper left corner and the ending pixel is set to the pixel at the lower right corner. As shown in FIG. 9, the comparison pixel c is a pixel which has just undergone the detection processing and is adjacent to the detecting pixel on the left side (upstream side in the X-axis direction). The comparison pixels a and b are pixels which belong to the line adjacent to and above the line to which the detecting pixel belongs (upstream side in the Y-axis direction). Amongst these, the comparison pixel b is adjacent to the detecting pixel on the upstream side (upstream side in the Y-axis direction) and the comparison pixel a is adjacent to the comparison pixel b on the left side (upstream side of X-axis) and adjacent to the comparison pixel c on the upstream side (upstream side of Y-axis).

The comparison pixel corresponding to the detecting pixel is determined by the position of the starting pixel. For example, when the starting pixel is set to the pixel at the lower right corner, the comparison pixel c is located on the right side of the detecting pixel and the comparison pixel b is located on the lower side of the detecting pixel. Then, the comparison pixel a is located on the right side of the comparison pixel b and on the lower side of the comparison pixel c. In this way, the comparison pixel a becomes the nearest pixel to the starting pixel among the detecting pixel and the comparison pixels a, b and c. On the other hand, the detecting pixel becomes the nearest pixel to the ending pixel among the detecting pixel and the comparison pixels a, b and c.

The determination data generation module 73 generates the determination data F based on these data and transmits the determination data F to the moving target object data determination module 74. Further, the generated determination data F is transmitted to the line memory 83 and the shift module 84 to be used during the generation of new determination data F as reference data (values of the comparison pixels a, b and c).

Further, a determination value J is set in advance in the determination data generation module 73, for detecting the trigger pixel, and when the value of the actual trail data Z of the detecting pixel is identical to the determination value J, the value of the actual trail data Z is set to the value of the determination data F. In this embodiment, the determination value J is set to 249, and when the value of the actual trail data Z of the detecting pixel is 249, the detecting pixel is recognized as the trigger pixel. At this time, the determination data generation module 73 sets the value of the determination data F to 249 and transmits it to the moving target object data determination module 74.

Further, the determination data generation module 73 compares the value of the actual trail data Z of the detecting pixel and the value of the comparison pixel described above, and even when the predetermined determination condition is satisfied, the value of the actual trail data Z of the detecting pixel is set to the value of the determination data. More specifically, when the value of the actual trail data Z (hereinafter, simply referred to as "Z" in the description given below) is identical to at least one of the values of the comparison pixels a, b and c or is greater than the comparison pixel values by 1, the determination data generation module 73 determines that the determination condition is satisfied. Note that this requires that the values of the pixels to be compared are not 0.

In other words, the determination data generation module 73 determines three conditions described below. That is, (1) for the value of the comparison pixel a, when a≠0 and whether a relation of the actual trail data Z=a or Z=a+1 is established; (2) for the value of the comparison pixel b, when b≠0, whether a relation of Z=b or Z=b+1 is established; and (3) for the value of the comparison pixel c, when c≠0, whether a relation of Z=c or Z=c+1 is established. Then, if at least one of the relations of (1) to (3) is established, it can be concluded that the determination condition is satisfied. For example, when the actual trail data Z of the detecting pixel is Z=251 and the values of the comparison pixels are a=0, b=0, and c=250, respectively, the determination condition is satisfied since the relation of (3) described above is established, and the value of the determination data F is then set to 251.

The moving target object data determination module 74 determines the existence of the moving target object in the detecting pixel by comparing a predetermined value S set in advance with the value of the determination data F, and writes moving target object data G indicating the determination result to the movement information storing image memory 45. Further, the moving target object data determination module 74 is inputted with the actual trail data Z from the actual trail image memory 42 as well as the determination data F. Further, moving target object data G(n−1) of the past is inputted to the moving target object data determination module 74 from the movement information storing image memory 45.

The moving target object data determination module 74 sets the value of G(n) to 1 when the current existence of the moving target object is determined, and, on the other hand, it sets the value of G(n) to 0 when the existence of the moving target object is not determined. Note that, a value which is the same as the value of the actual trail data Z indicating the existence of the target object in the pixel is set to the predetermined value S. In this embodiment, the value of 255, which is the possible maximum value for the actual trail data Z and indicates the existence of the target object, is set to the predetermined value S.

The line memory 83 is configured to be able to store the determination data F inputted from the determination data generation module 73 for one line. The determination data generation module 73 can read out the values of the comparison pixels a and b from the line memory 83. Both the shift modules 84 and 85 are delay circuits constituted by shift registers or the like. The shift module 84 delays the inputted determination data F and outputs it as the value of the comparison pixel c to the determination data generation module 73. The shift module 85 delays the inputted data from the line memory 83 and outputs it as the value of the comparison pixel a to the determination data generation module 73.

The determination data generation module 73 checks a continuity of the actual trail data Z in a predetermined direction, and when the determination condition is satisfied, the determination data F corresponding to the actual trail data Z is set in the detecting pixel. Therefore, it can be said that the determination data F is data which indicates that the actual trail data Z has the continuity in the predetermined direction. Further, since the value which is the same as the value of the actual trail data Z is set to the determination data F, when the determination data F becomes identical to the predetermined value S, it indicates that the actual trail data Z continues up to the pixel with the presence of the target object in the predetermined direction.

Note that the term "predetermined direction" as used herein means a predetermined angular range including the predetermined direction.[ipto1] For example, when the starting pixel is set to the pixel at the upper left corner (in the case of FIG. 9), the target object moving to the right, the target object moving downward, and the target object moving to the lower right (ending pixel side), are detected as the moving target objects.

As described above, the positional relations between the comparison pixels and the detecting pixel are determined according to the position of the starting pixel. Therefore, when the target objects are detected as the moving target objects, directions of the movement will be as described below according to the position of the starting pixel. That is, when the starting pixel is set to the pixel at the upper right corner, the target object moving to the left, the target object moving downward and the target object moving to the lower left are detected as the moving target objects. Alternatively, when the starting pixel is set to the pixel at the lower right corner, the target object moving to the left, the target object moving upward, and the target object moving to the upper left are detected as the moving target objects. Alternatively, when the starting pixel is set to the pixel at the lower left corner, the target object moving to the right, the target object moving upward, and the target object moving to the upper right are detected as the moving target objects.

Therefore, the movement of the target objects in all the directions can be detected by setting the starting pixel at any of the four corners and carrying out the detection processing. In this embodiment, in order to detect the movement of the target objects in all the directions, the position of the starting pixel is changed and the detection processing is carried out repeatedly for four times for the moving target objects. That is, the detection processing for the moving target object is carried out for each predetermined direction for which the movement of the target object is detected, by changing the positional relations between the comparison pixels and detecting pixel. Note that, the change in the scan direction is described below.

Next, the particular processing for detecting the moving target objects is described with reference to the flowchart of FIGS. 10 and 11. Note that, according to the description referring to FIGS. 10 and 11, the position (address) of the starting pixel is set at the upper left corner and the position (address) of the ending pixel is set at the lower right corner.

When the detection processing for the moving target objects is started, the flow of FIG. 10 starts. First, the determination data generation module 73 checks if the processing is in the first line by checking whether the value of n indicating the Y coordinate (Yf+n) is 0 (S301). When n=0, in other words, when the processing is in the first line, the values of the comparison pixels a and b are set to 0 (S302). When n≠0 (second line onwards), the determination data generation module 73 checks whether the value of m is 0 for checking whether the pixel to be processed is at the left end (S303). When m=0, in other words, when the pixel to be processed is at the left end, the determination data generation module 73 obtains the value of the comparison pixel b stored in the line memory 83 in advance (S304), and the value of the comparison pixel a is set to 0 (S305). When m=0, the determination data generation module 73 obtains the values of the comparison pixels a and b stored in the line memory 83 in advance (S306).

Next, the determination data generation module 73 sets the value of the comparison pixel c according to the value of m. More specifically, the determination data generation module 73 checks whether the value of m is 0 (S307). Then, when m=0, the value of the comparison pixel c is set to 0 (S308). When m≠0, the determination data generation module 73 sets the value of the determination data F which is one pixel before by being delayed by the shift module 84 is set to the value of the comparison pixel c (S309).

Next, the determination data generation module 73 obtains the actual trail data Z from the actual trail image memory 42 (S310). Then, the determination data generation module 73 checks whether the obtained value of the actual trail data Z is identical to the value of the determination value J (S311 of FIG. 11), and when Z=J, it sets the value of the actual trail data Z to the value of the determination data F (S312).

When Z≠J at the processing of S311, the determination data generation module 73 compares the values of the comparison pixels a, b and c set in the above-described processing with the value of the actual trail data Z to check whether the determination condition is satisfied (S313). When the predetermined condition is satisfied, the value of the actual trail data Z of the detecting pixel is set to the value of the determination data F (S312). When the predetermined condition is not satisfied at the determination of S313, the value of the determination data F is set to 0 (S314).

The determination data generation module 73 outputs the determination data F to the moving target object data determination module 74 and outputs it to the line memory 83 as well to store the determination data F in the line memory 83 (S315). The moving target object data determination module 74 checks whether the received value of the determination data F is identical to the predetermined value S (S316). In this embodiment, the moving target object data determination module 74 checks whether the value of the determination data F is 255. When the value of the determination data F is identical to the predetermined value S, the existence of the moving target object is determined and the value of G is set to 1 (S317).

When the determination data F is not identical to the predetermined value S at the determination of S316, the moving target object data determination module 74 checks whether the pixel is the same as the one detected as the moving target object in the prior detection processing (S318). That is, in this embodiment, as described above, for detecting the movement of the target objects in all the directions, the scan direction is changed and the detection of the moving target object is repeated four times. However, the moving direction of the target object detected as the moving target object may vary according to the scan direction. For this reason, the value of G which has been set to 1 until now by being detected as the moving target object is overwritten with 0 when the scan direction is changed and the pixel concerned is no longer detected as the moving target object. For preventing such a situation, even when the determination data F is determined not to be identical to the predetermined value S at the determination of S316, the moving target object data determination module 74 checks whether the value of G(n−1) (the past value of G) stored in the movement information storing image memory 45 is 1 and whether the actual trail data Z has the maximum value of 255 (S318). If these conditions are satisfied, the value of G is set to 1 (S317). On the other hand, when the past value of G(n−1) is not 1 at the determination of S318 (when G=1 is not set according to the scanning of the past), the moving target object data determination module 74 determines that the moving target object does not exist and sets the value of G to 0 (S319).

Note that the reason why the determination is made whether the value of the actual trail data Z is identical to the predetermined value S (255) at the determination of S318 is that there is a possibility that, even though the target object no longer exists at the position of the pixel concerned, the value of G is set to 1 based on the data of one previous rotation of the radar antenna 1 and, thus, the value of G should be set to 0 in this case.

The moving target object data determination module 74 writes the value of G set at the processing of S317 or S319 in the movement information storing image memory 45 (S320).

The moving target object data G is stored in the movement information storing image memory 45 for every pixel by repeatedly carrying out the processing of S301 to S320 described above for all the pixels shown in FIG. 6. According to this, G=1 is set for the pixel determined as the moving target object and G=0 is set for all the other pixels. Then, the moving target object data G, which is obtained by detecting the movement of the target objects in all the directions, is stored in the movement information storing image memory 45 by carrying out the detection processing for four times while changing the position of the starting pixel.

Figure 12:
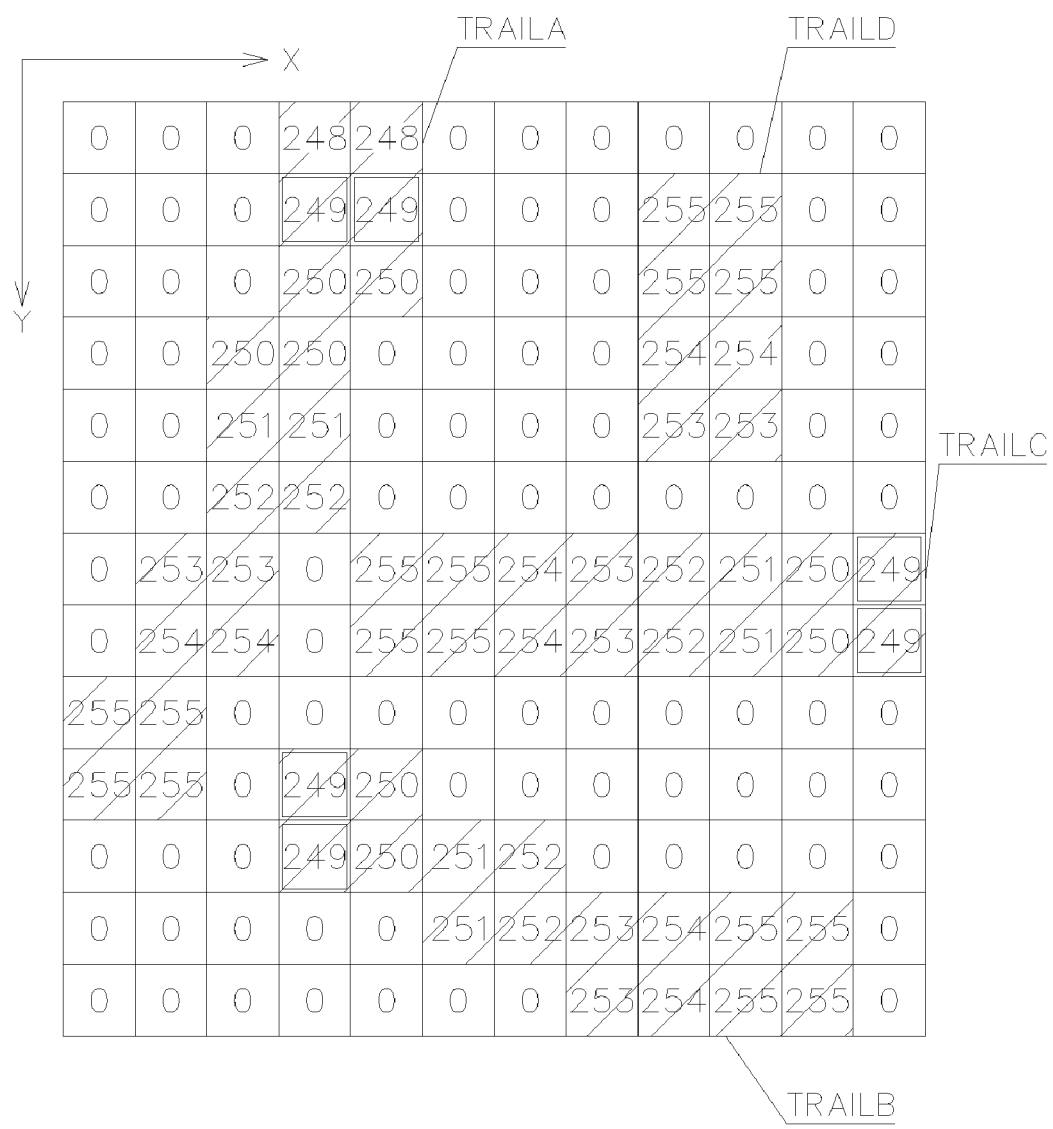
FIG. 12 is a schematic view showing an example distribution of actual trail data when a target object which moves in various directions.
Figure 14:
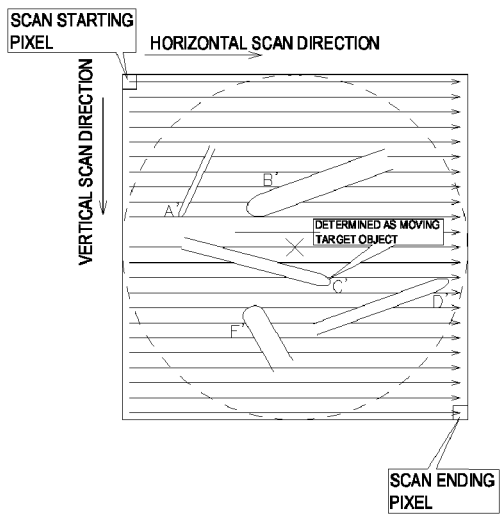
FIGS. 14A to 14D are schematic views showing processing for detecting the moving target object for every scan direction.
Figure 14:
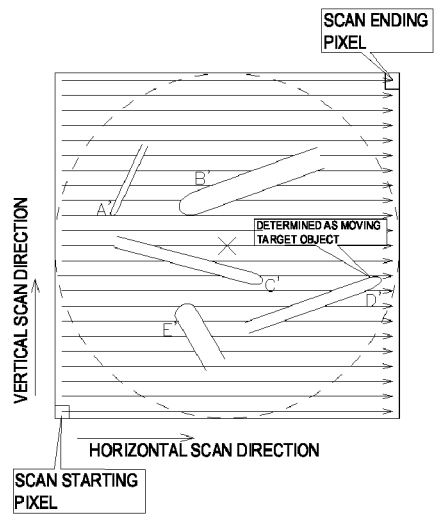
Figure 14:
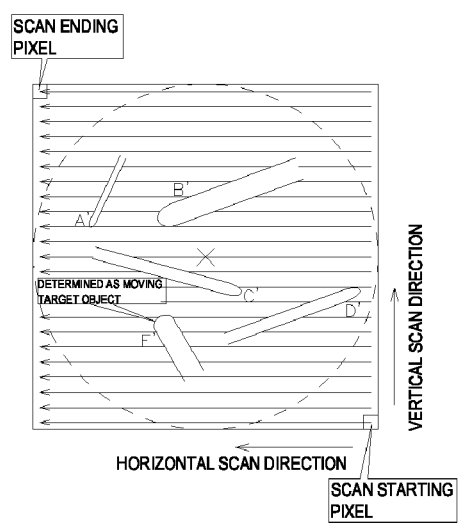
Figure 14:
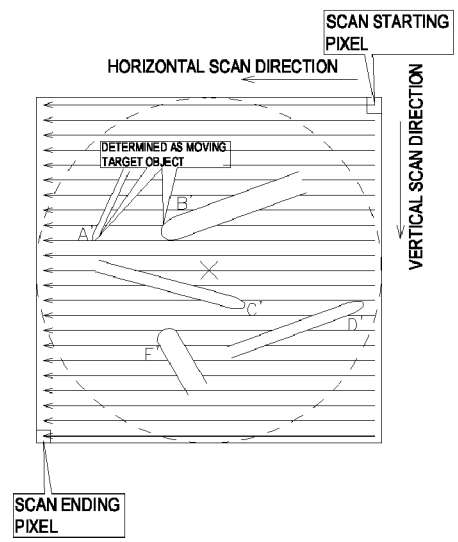

Next, the moving target object data G, which is stored in the movement information storing image memory 45, is described with reference to FIGS. 12 and 13. FIG. 12 is a schematic diagram showing an example distribution of the actual trail data Z which represent the movement of target objects in various directions. FIG. 13 is a schematic diagram showing an example distribution of the moving target object data G corresponding to the example distribution of FIG. 12. Note that, in FIG. 12, the pixels with the actual trail data Z having a value of 249 are shown enclosed in rectangles emphatically. Similarly, in FIG. 13, the pixels with the moving target object data G having a value of 1 is emphatically shown.

In the example shown in FIG. 12, the actual trail image memory 42 is represented by vertical 13 pixels and horizontal 12 pixels, whereas trails of four target objects (trails A to D) are stored in the actual trail image memory 42. The target object of the trail A moves to the lower left whereas the target object of the trail B moves to the lower right. In addition, the target object of the trail C moves to the left whereas the target object of the trail D moves upwardly. Note that the terms "upward," "downward," "to the left," and "to the right" as used herein indicate directions in the figures.

Here, it is considered that, for the actual trail data group stored in such a way, the starting pixel is set at the upper left corner whereas the ending pixel is set at the lower right corner, and the detection processing of the moving target objects is carried out. Here, the determination value J used at the determination of S311 in FIG. 11 is 249. According to this detection processing, the moving target object data G of movement information storing image memory 45 will be as shown in FIG. 13A. As shown in FIG. 13A, in the initial detection processing, the target object corresponding to the trail B moving to the lower right (ending pixel side) is detected as the moving target object, and the value of 1 is written as the value of the moving target object data G.

The detection processing will be described in detail below. Note that, when the pixel shown in FIG. 12 is to be specified, the pixel positioned at the p-th row and the q-th column is represented as (p, q), for example. The detection processing is carried out beginning with the starting pixel of (1, 1), and proceeded sequentially in the order of (2, 1), (3, 1), . . . in the horizontal direction. Then, when the detection processing of the pixels in the first line is completed, the detection processing for the pixels in the second line will start as (1, 2), (2, 2), (3, 2), . . . . In this way, the detection processing is carried out from the line of the starting pixel to the line of the ending pixel while moving the processing line one by one. Then, for the respective processing lines, the detection processing is carried out for the pixels by moving one pixel at a time from the same row as the starting pixel (first row) to the same row as the ending pixel (twelfth row).

In this example, the pixel whose pixel information value is set to 249 is searched as the trigger pixel. Therefore, in FIG. 12, first, the pixel of (4, 2) is searched as the trigger pixel. Further, the pixel of (5, 2) is also searched as the trigger pixel.

The detection processing thereafter attempts to track the pixels one by one for which the pixel information is the same or greater by 1, from the trigger pixel (4, 2) described above to the pixels on the immediate right, immediate below, or immediate lower right. However, when the trigger pixel (4, 2)

is set to the starting point, the pixel information value increases only up to 252 at (4, 6). Similarly, even if the pixels are tracked one by one from the trigger pixel (5, 2) in a similar direction to the above, the pixel information value increases only up to 250 at (5, 3). In this way, since the pixel information value does not reach 255, the moving target object will not be detected.

If the detection processing is continued further, (12, 7) and (12, 8) are searched as the trigger pixels. However, since these pixels are located at the right end, the further tracking to the right side is not possible; further, the pixel information value for the immediately below pixel (12, 9) is 0. Therefore, the moving target object is not detected here as well.

Next, (4, 10) is searched as the trigger pixel. Then, when the pixels for which the pixel information is the same or greater by 1 are tracked one by one from the trigger pixel (4, 10) and continuing to the right, below and lower right, the pixel information value increases by one such as 250, 251, 252, . . . and reaches the pixel with the pixel information value of 255 in due course. Therefore, as shown in FIG. 13A, it is determined that these pixels (that is, four pixels (10, 12), (11, 12), (10, 13) and (11, 13)) are the moving target objects, and 1 is written to the value of the moving target object data G. Then, the detection processing (scanning) is completed for all the pixels for the first round after carrying out the detection processing up to the ending pixel (12, 13).

Further, if the starting pixel is changed to the upper right corner, the lower left corner, and the lower right corner, respectively, and the scan processing is carried out four times including the initial processing, though the details of the processing are not described, the moving target object data G as shown in FIG. 13B is stored in the movement information storing image memory 45. As shown in FIG. 13B, when the scan processing is completed for four times, the target objects corresponding to the trail A and the trail C are detected as the moving target objects besides the trail B, and 1 is written to the value of the moving target object data G.

Note that the target object of the trail D is not detected as the moving target object in the current detection processing. This is because that the trigger pixel is not detected since the trail D does not have the actual trail data Z identical to the determination value J. If the determination value J is set at a greater value (for example, set at 253), the target object of the trail D can be detected as the moving target object.

In this way, by increasing the determination value J, the detailed tracking of a slow moving target object or a target object which has just started moving can be detected without being overlooked. On the other hand, if the determination value is set to a less value, the target object will not be detected as the moving target object unless it moves a greater distance in the definite direction. As described above, the determination value J defines sensitivity for detecting the movement of the target objects. In this embodiment, the determination value J is configured so that its set value is changed by the operator.

Note that, in the description given above, only the pixel, for which the value of the actual trail data Z matches with the determination value J, is detected as the trigger pixel. Further, when the detecting pixel value is increased by 1 from the comparison pixel value, a value obtained by adding 1 to the determination data F, which is set to the pixel position of the comparison pixel, is set to new determination data F of the detecting pixel. However, the trigger pixel detection and the determination data generation can be performed by other methods.

For example, a method of generating the determination data by carrying out the detection of the trigger pixel based on a determination range set in advance will be described. This method determines whether the value of the actual trail data Z of the detecting pixel is within the determination range, and detects a pixel with the value of the actual trail data Z within the determination range as the trigger pixel. For example, if the lower limit and the upper limit of the determination range are set to 248 and 251, respectively and when the value of the actual trail data Z of the detecting pixel is within the determination range (for example, when the value of the actual trail data Z is 249), the pixel is detected as the trigger pixel.

In this case, the determination data F is generated based on the continuity determination condition set in advance corresponding to the detection method of the trigger pixel. For example, when the value of the comparison pixel is $a \neq 0$ and the condition of the actual trail data being $Z=a$ or $Z=a+(1\ to\ 3)$ is satisfied, the determination data is generated by an arbitrary method so as to satisfy the continuity. Note that, the comparison pixel b and the comparison pixel c will be treated in a similar manner. When the determination data set in such a way matches with the predetermined value S set in advance, the target object of the actual trail is detected as the moving target object.

For example, when the target object of interest is moving at a low speed, the values of the actual trail data Z are arranged from the side of the pixel where the target object exists (pixel with the pixel information value of 255), in the order of 252, 249, . . . Even in such a case, the trigger pixel to be detected can be positively detected by adopting the method described above. In addition, the determination data can be generated with the continuity, thereby the target object moving at a low speed in fact can be determined more accurately as the moving target object.

Next, a method of generating the determination data for enabling to detect the continuity considering the adjacent pixels is described. When the target object of interest moves at a high speed, the target object moves for more than two pixels in a predetermined direction within one rotation of the radar antenna 1. For such a case, the values of the trail data set by the trail data generation module 41 may be arranged in the order of 255, 0, 254, 0, 253, . . . , and even for the moving target object, the value of the trail data Z may not have the continuity in the predetermined direction.

Therefore, the moving target object is detected by performing the following processing. That is, the pixel for which 0 is detected is compared with the surrounding pixels, and if the value of the actual trail data Z of the pixels interposing 0 therebetween in a predetermined direction has the continuity, the determination data F is generated according to the value of the actual trail data Z of the pixels interposing the 0-value pixel. For example, if the values of the actual trail data Z are arranged in a predetermined direction in the order of 254, 0, 253, 254 and 253, the pixels located so as to interpose 0 therebetween are compared. Since 254 and 253 has continuity, the determination data F is generated for the 0-value pixel based on the value of 253 (or 254).

Note that the allowable number of zeros which exist in-between can be set arbitrary according to the radar display range or the number of pixels for the image memory. For example, even in a case where the values of the actual trail data Z are arranged in the order of 254, 0, 0 and 253, it can be set to determine that the pixels have continuity. Thereby, even when the target object is moving at a high speed, the target object can be determined as the moving target object.

Next, a relation between the scan direction and the detected position of the target object is described with reference to FIGS. 14A to 14D. Trails of five target objects A' to E' are displayed as actual trails in FIGS. 14A to 14D. The target object A' and the target object B' both move to the lower left. The target object C' moves to the lower right, the target object D' moves to the upper right, and the target object E' moves to the upper left, respectively.

In FIG. 14A, the starting pixel is set to the pixel in the upper left corner, and the ending pixel is set to the pixel in the lower right corner. In addition, scanning in the X-axis direction is performed to the right side. In this scan, the target object C' is detected as the moving target object. In FIG. 14B, the starting pixel is set to the pixel in the lower left corner, and the ending pixel is set to the pixel in the upper right corner. Then, scanning in the X-axis direction is performed to the right side. In this scan, the target object D' is detected as the moving target object.

In FIG. 14C, the starting pixel is set to the pixel in the lower right corner, and the ending pixel is set to the pixel in the upper left corner. Then, scanning in the X-axis direction is performed to the left side. In this scan, the target object E' is detected as the moving target object. In FIG. 14D, the starting pixel is set to the pixel in the upper right corner, and the ending pixel is set to the pixel in the lower left corner. Then, scanning in the X-axis direction is performed to the left side. In this scan, the target objects A' and B' are detected as the moving target objects.

In this way, the target objects moving in all the directions can be detected by carrying out the detection processing in the quadruplicate scan direction. Further, when the moving target objects are detected while carrying out the sweep line drawing, the complex processes become necessary; however, in this embodiment, since the detection processing is carried out as a separate processing from the sweep line drawing process, the processing can be simplified. Further, since the actual trail image memory 42 is constituted by the SDRAM or the like which can continuously access in the X-axis direction at a high speed, the access to each pixel of the actual trail image memory 42 can be carried out with high efficiency and the detection of the moving target objects can be carried out at a high speed.

According to the above-described processing, the moving target object data G is stored in the movement information storing image memory 45. Then, corresponding to the value of the moving target object data G, appropriate color information are preset to the color palette 21 shown in FIG. 1. As a result, the pixel in which G=1 indicating a moving target object is set, is displayed by a color different from the pixels of other target objects. For example, ordinary target objects (stationary target objects) are displayed in blue, and moving target objects are displayed in red.

Figure 15:
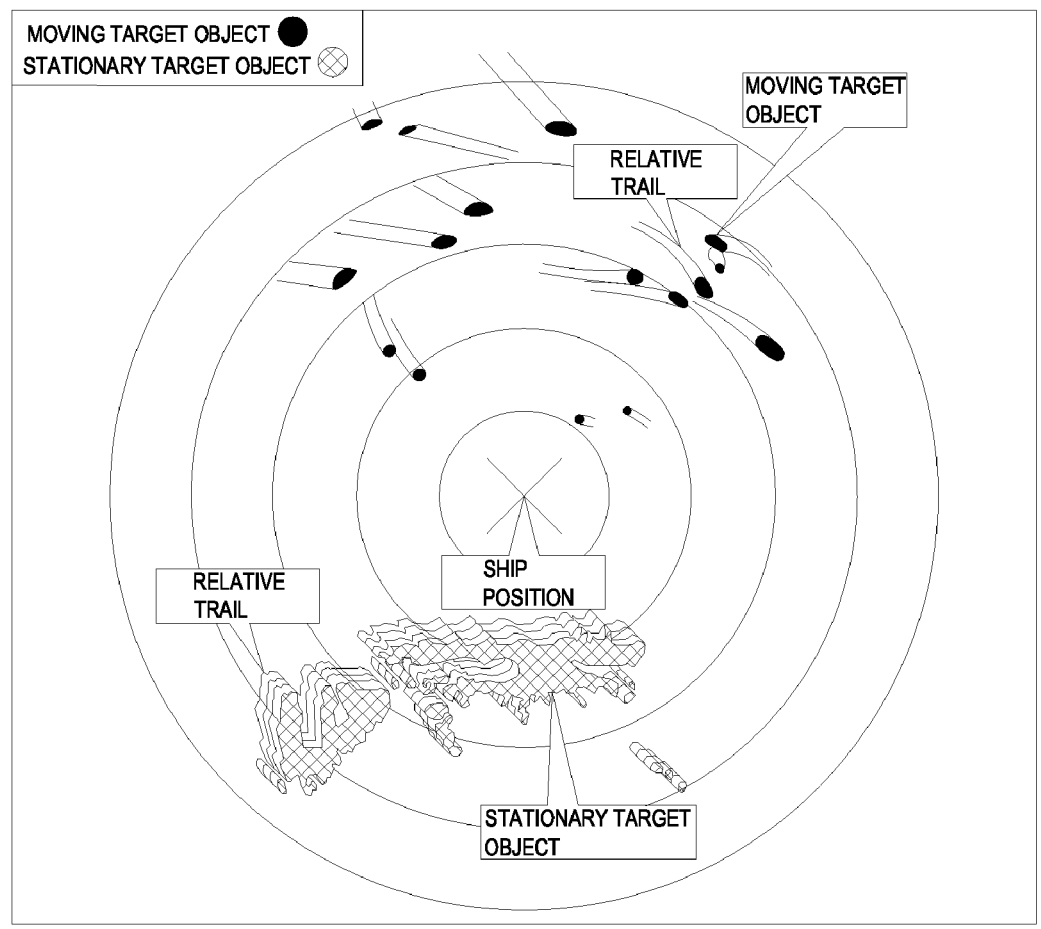
FIG. 15 is a schematic view showing a radar image which displays a relative trail where stationary target objects and moving target objects are displayed so as to be distinguished from each other.

FIG. 15 is a schematic diagram showing a display example of a radar screen where the relative trails are displayed and the stationary target objects and the moving target objects are displayed separately. Note that FIG. 15 indicates a case where the ship concerned is moving from the lower right to the upper left. Further, for the convenience of the drawing, the difference in the colors is represented by different hatchings$_{[ipto2]}$ in FIG. 15. As shown in FIG. 15, even if the relative trail is displayed on the radar screen, the stationery target objects such as land and the like and the moving target objects are displayed so as to be distinguished by colors, therefore, the operator can immediately recognize the moving target objects. Further, the image processing device 10 equipped in the radar apparatus 5 of this embodiment can display the moving target objects so as to distinguish them not only in the relative trail display mode but also in the actual trail display mode. Therefore, the operator can determines whether the target object of interest is a moving target object accurately and immediately, while the trail in the preferred display mode is displayed. Alternatively, the relative trail displayed on the radar screen of FIG. 15 may not be displayed (trail display mode OFF). In this case as well, since the moving target objects are displayed so as to be distinguished from the stationery target objects, the operator can immediately recognize the moving target objects.

As shown above, the image processing device 10 equipped in the radar apparatus 5 of this embodiment is configured as follows. That is, the image processing device 10 includes the actual trail image memory 42 and the moving target object determination processing module 44. The actual trail image memory 42 is configured so as to store the actual trail data group showing the absolute change in position of the target objects detected by the echo signals obtained for the detection signals transmitted in different azimuth directions. Based on the actual trail data group, the moving target object determination processing module 44 determines whether the target objects detected from the detection signals described above are the moving target objects.

Thereby, the configuration that can determine whether the target objects of interest are the moving target objects can be implemented by simple processing that utilizes the actual trail data group stored in the actual trail image memory.

Further, the image processing device 10 of this embodiment carries out the image processing so that the moving target object determination processing module 44 displays the target objects determined as the moving target objects distinguishing from other target objects.

Thereby, since the moving target objects are displayed so as to be distinguished from other target objects, the operator (user) of the radar apparatus 5 can intuitively and immediately recognize the moving target objects.

Further, the image processing device 10 of this embodiment carries out the image processing so that the actual trails of the target objects along with that target objects are displayed based on the actual trail data group.

Thereby, since the actual trails are displayed with the moving target objects which are displayed so as to be distinguished from other moving target objects, the moving directions of the moving target objects can be easily recognized based on the actual trail display.

Further, the image processing device 10 of this embodiment is configured as described below. That is, the image processing device 10 includes the relative trail image memory 32 that can store the relative trail data showing the relative changes in position of the target objects for the transmitting position where the detection signals are transmitted (at the ship concerned). Further, the image processing device 10 performs the image processing so as to display the target objects and the relative trails thereof based on the relative trail data group (Refer to FIG. 15).

Thereby, based on the relative trail display, the moving target object, which is relatively approaching the ship concerned (the transmission position where the radar antenna 1 transmitted the detection signal), can be recognized intuitively or immediately, and actions to avoid a collision can be taken quickly.

Further, the image processing device 10 of this embodiment is configured as described below. That is, the actual trail data Z is information generated per pixel which constitutes the actual trail image memory 42, and information which changes in a stepwise fashion from 255 to 0 according to the time elapsed from the recent detection of the target object. The moving target object determination processing module 44 searches the actual trail data having the predetermined value stored in the actual trail image memory 42 as the trigger pixel. Therefore, for the series of pixels continued in the predetermined direction from the pixel position of the trigger pixel in the actual trail image memory 42 to the pixel position of the pixel set to 255 as the pixel position, which is the value indicating the existence of the target object, and when the pixel information value changes from the pixel information value of the trigger pixel (the determination value J) one step at a time and reaches 255 (when the actual trail data changes while satisfying the predetermined condition), the moving target object determination processing module 44 determines the pixel position of the pixel set to 255 as the value indicating the existence of the target object as the pixel position where the moving target object exists.

Thereby, the moving target objects can be determined based on the value of the actual trail data set to the series of pixels from the trigger pixel to the pixel indicating the existence of the target object, and the processing for determining the moving target objects can be implemented with a simple configuration.

In addition, the image processing device 10 of this embodiment is configured as described below. That is, the image processing device 10 includes the moving target object detection address generation module 43. The moving target object detection address generation module 43 sets one of the pixels of the four corners of the actual trail data group represented by the matrix in the actual trail image memory 42 as the starting pixel, and sets the pixel located diagonal to the starting pixel among the pixels of the four corners of the actual trail data group as the ending pixel. Then, the moving target object detection address generation module 43 calculates the position of the detecting pixel where the determination processing of the moving target objects are carried out, while moving the processing line one by one from the starting pixel line to the ending pixel line, so that, for each processing line, the detecting pixel position is moved one by one from the pixel corresponding to the starting pixel in the column direction to the pixel corresponding to the ending pixel in the column direction. Further, the moving target object determination processing module 44 includes the determination data generation module 73 and the moving target object data determination module 74. The determination data generation module 73 compares the pixel information value of the detecting pixel (actual trail data value) with the pixel information value of the comparison pixel which is a pixel surrounding the detecting pixel and for which the determination processing has already been completed. Then, when the pixel information value of the detecting pixel is the same as the value of the comparison pixel, or when the pixel information value is one step closer to the predetermined value (when it shows the tendency to get closer to the value of the actual trail data indicating the existence of the target object), the determination data generation module 73 generates the determination data F according to the pixel information value of the detecting pixel. When the determination data F becomes identical to the predetermined value (255) of the pixel information indicating the existence of the target object, the moving target object data determination module 74 determines that the pixel position of the detecting pixel is the pixel position where the moving target object exists.

Thereby, the target objects which moves towards the ending pixel side can be detected based on the determination data F.

Further, in the image processing device of this embodiment, the moving target detection processing module 44 carries out the determination processing of all the pixels repeatedly while changing the starting pixel within the pixels of the four corners of the actual trail data group, respectively.

Thereby, the target objects which move in any directions can be detected as the moving target objects without omission.

Second Embodiment

Figure 16:
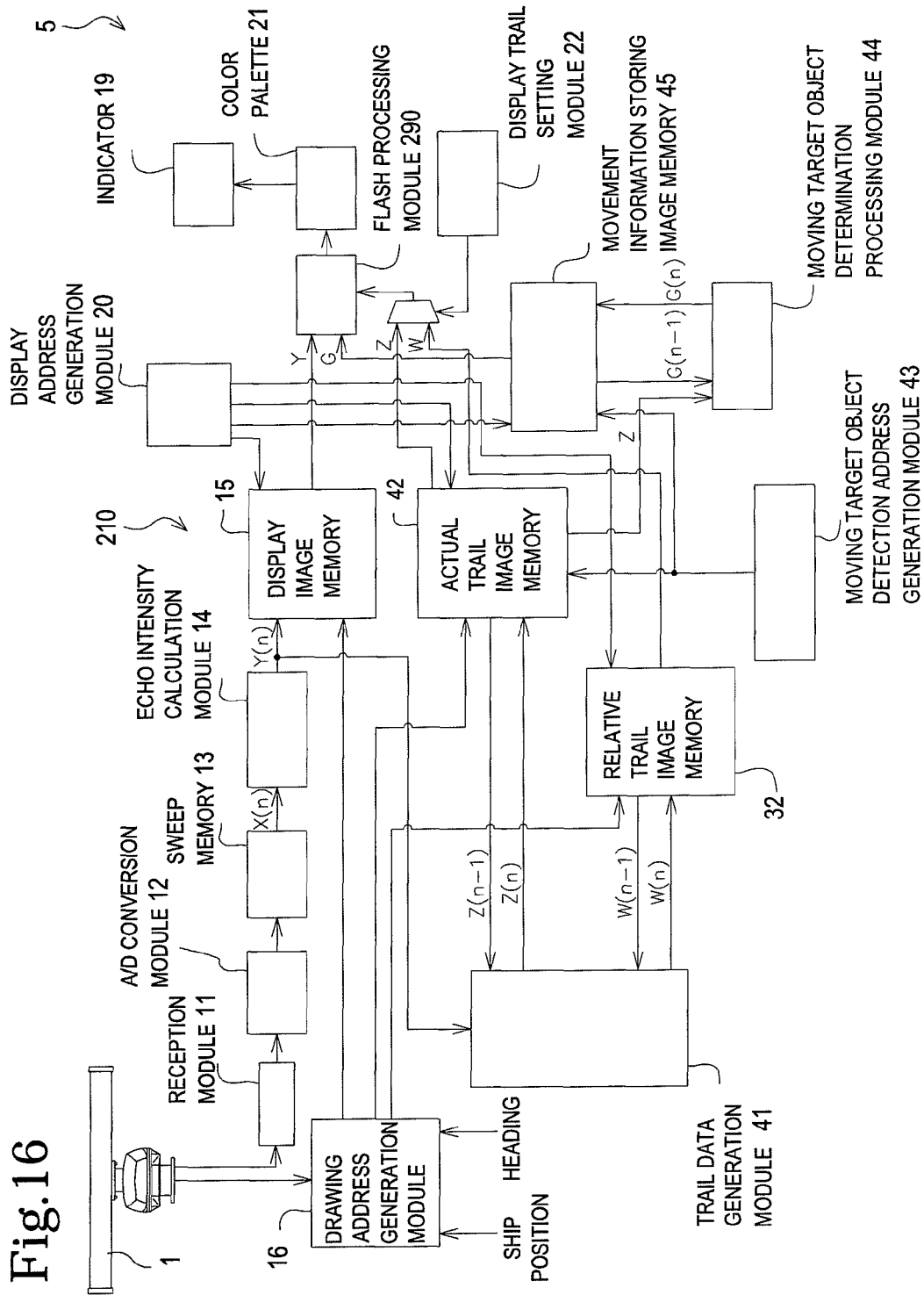
FIG. 16 is a block diagram schematically showing a configuration of a radar apparatus equipped with an image processing device according to a second embodiment of the invention.

Next, the radar apparatus 5 equipped with an image processing device 210 of a second embodiment is described with reference to FIG. 16, where the image processing device 210 displays the moving target objects by flashing so as to distinguish the moving target objects from other target objects. Note that, in the image processing device 210 of the second embodiment, parts other than the flashing configuration for the moving target objects are similar to the configuration of the first embodiment. Therefore, the same reference numerals are used in the drawing for similar and identical configurations, and their descriptions are omitted.

Figure 17:
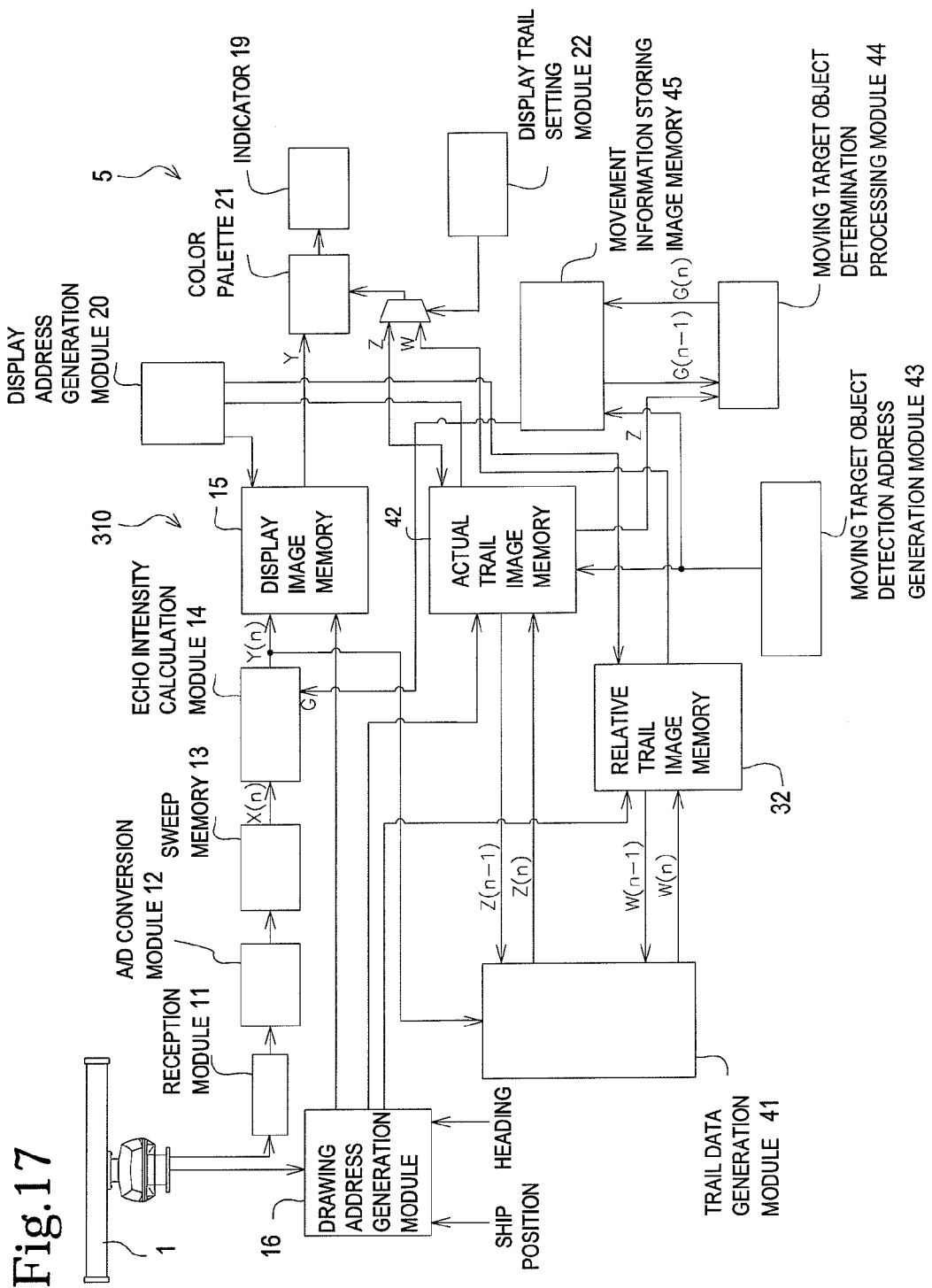
FIG. 17 is a block diagram schematically showing a configuration of a radar apparatus equipped with an image processing device according to a third embodiment of the invention.

As shown in FIG. 17, the image processing device 210 of this embodiment includes a flash processing module 290 in addition to the configuration of the first embodiment. The flash processing module 290 displays and does not display pixel data corresponding to the detected moving targets at a predetermined flashing cycle. The flash processing module 290 has a flashing cycle generation module (not illustrated), which determines the flashing cycle.

The flash processing module 290 is inputted with the echo data Y from the display image memory 15, and is inputted with the moving target object data G from the movement information storing image memory 45. After appropriate processing is performed by the flash processing module 290, the echo data Y and the moving target object data G are outputted to the indicator 19 with reference to the color palette 21. Thereby, by the indicator 19, the pixels of the target objects which are determined as the moving target objects are displayed so as to be flashed.

Third Embodiment

Next, with reference to FIG. 17, the radar apparatus 5 equipped with an image processing device 301 of a third embodiment is described, where the image processing device 301 displays the moving target objects so as to be distinguished at a timing where sweep lines are drawn. Note that, in the image processing device 310 of the third embodiment as well, the same reference numerals are used in the drawing for similar and identical configurations; thus, their descriptions are omitted.

As shown in FIG. 17, in the image processing device 310, the moving target object data G is outputted to the echo intensity calculation module 14 from the movement information storing image memory 45. Then, when the echo data Y constituting the echo intensity data group for one sweep is outputted from the echo intensity calculation module 14 to the display image memory 15 in the order of time series, the moving target object data G is also outputted, and the data is drawn simultaneously in the display image memory 15. Therefore, when the moving target objects exist on the sweep line, the pixels with the existence of the moving target objects will be displayed so as to be distinguished (colored) on the indicator 19 at the timing where the pixels are drawn.

By configuring the image processing device 310 of this embodiment as described above, the operator can be given an impression that the moving target objects are detected in parallel with the sweep of the radar apparatus. That is, in this embodiment (and the two embodiments described above), the simplification of the detection processing of the moving target objects can be achieved by performing the processing of the detection of the moving target objects which is independent of the drawing of the sweep lines. However, if the processing for displaying the moving target objects so as to be distinguished from other target objects (similar to the first embodiment and the second embodiment) is carried out independently of the sweep line drawing, the stationary target objects are updated by sweep and the moving target objects are detected at a timing which has no relation to it whatsoever, and there is a possibility that the operator who is accustomed to the normal radar display may sense discomfort. In this regard, in this embodiment, since the display of the moving target objects by a special visual mode is also carried out at the timing of the sweep line drawing, the radar screen can be naturally updated as if the detection of the moving target objects is carried out synchronizing with the sweep of the radar apparatus.

As shown above, in the image processing device 310 of this embodiment, the echo data Y is drawn as the sweep line, and the processing for displaying the pixels which are determined that the moving target objects exist so as to be distinguished from other target objects is performed through the sweep line drawing.

Thereby, since the pixels of the moving target objects are displayed so as to be distinguished from the pixels of other target objects by the sweep line drawing, the operator can recognize the presence of the moving target objects without discomfort.

Although several embodiments of the invention are described above, the above configurations of the embodiments may be further modified as follows.

Other than the illustrations provided in the first and second embodiments, the display method of the moving target objects may adopt any other methods as long as they are capable of displaying the moving target objects so as to be visually distinguished from the stationary target objects. For example, it is possible to display them so as to alternate their colors between two colors (for example, red and yellow) at a predetermined cycle.

In the above embodiments, the pixel information set as the trail data is configured to have the value of 255 which indicates the presence of the target object, and the value is decreased by one along with the passage of time. However, the representing mode of the trail data is optional; for example, when the target object exists, it may be set to 0 and increased by one with the passage of time. Further, the configuration representing the pixel information value of the trail data is not limited to 256 tones; for example, it can be changed to represent by 8 tones, 16 tones, etc.

In the embodiments described above, the value equal to the pixel information value is set to the determination data F. However, not being limited to this, at the time when the trigger pixel is searched, the determination data nay be set to 1, and, then, the determination data value may be increased as 2, 3, ... every time the pixel information value is increased by 1.

In addition to the configurations of the embodiments described above, the radar apparatus may be configured to be equipped with an alarm system that activates an informing device, such as a buzzer, when the moving target object is detected entering a preset alarm range.

Further, it is also possible to omit the relative trail display function from the radar apparatus in the above embodiments.

The image processing device 10 of this embodiment is configured to be equipped in the radar apparatus 5; however, it is not limited to this configuration. For example, it is possible to be configured so that the image processing device is arranged separately from the radar apparatus and the image processing device communicates with the radar apparatus to carry out the image processing.

In the foregoing specification, specific embodiments of the present invention have been described. However, one of ordinary skill in the technique appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relation or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An image processing device, comprising:
    an actual trail image memory for storing an actual trail data group indicating absolute changes in position of a target object detected by echo signals obtained corresponding to detection signals transmitted while changing an azimuth direction of the transmission;
    a relative trail image memory for storing a relative trail data group indicating relative changes in position of the target object with respect to a transmission origin location of the detection signals; and
    a moving target object determination processing module for determining whether the target object detected with the detection signals is a moving target object based on the actual trail data group;
    wherein a relative trail of the target object is displayed along with the target object, the displayed relative trail being based on the relative trail data group; and wherein the target object determined to be the moving target object by the moving target object determination processing module is displayed so as to be distinguished from another target object with a relative trail substantially similar to that of the moving target object.

2. The image processing device of claim 1, wherein an actual trail of the target object is displayed along with the target object based on the actual trail data group.

3. The image processing device of claim 1, wherein the actual trail data is information that is generated per pixel constituting the actual trail image memory and information that varies in a stepwise fashion with the time elapsed immediately after the target object is detected; and wherein the moving target object determination processing module:

searches the actual trail data that has a predetermined value and is stored in the actual trail image memory as a trigger pixel; and determines, if the actual trail data varies while satisfying a predetermined condition from a pixel position of the trigger pixel in the actual trail image memory to a pixel position corresponding to the actual trail data indicating the presence of the target object, that the pixel position corresponding to the actual trail data indicating the presence of the target object is a pixel position where the moving target object exists.

4. The image processing device of claim 3, wherein one of the pixels located at four corners of the actual trail data group expressed by a matrix in the actual trail image memory is set to a starting pixel, and of the pixels located at the four corners of the actual trail data group, another pixel located diagonal to the starting pixel is set to an ending pixel;

wherein the image processing device comprises a pixel position calculation module for calculating a position of a detecting pixel where the determination processing of the moving target object is carried out so that a processing row is moved by one row from a row of the starting pixel to a row of the ending pixel, and for each processing row, the detecting pixel is moved by one pixel from a pixel corresponding to the starting pixel in a column direction to a pixel corresponding to the ending pixel in the column direction;

wherein the moving target object determination processing module compares a value of the actual trail data of the detecting pixel with a value of the actual trail data of a comparison pixel that is a pixel around the detecting pixel and has been finished with the determination processing; and wherein the moving target object determination processing module includes:

a determination data generation module for generating, if the value of the actual trail data of the detecting pixel is identical to the value of the comparison pixel, or if the value of the actual trail data indicates a tendency to approach a value of the actual trail data that indicates the presence of the target object, based on the value of the comparison pixel, determination data according to the value of the actual trail data of the detecting pixel; and a moving target object data determination module for determining, when the determination data becomes the value indicating the presence of the target object, that the pixel position of the detecting pixel is a pixel position where the moving target object exists.

5. The image processing device of claim 4, wherein the moving target object determination processing module carries out the determination processing for all the pixels repeatedly while changing the starting pixel among the pixels at the four corners of the actual trail data group, respectively.

6. A radar apparatus equipped with the image processing device of claim 1.

7. A method of processing an image, comprising:

obtaining echo signals corresponding to detection signals transmitted while changing an azimuth direction of the transmission;

storing absolute changes in position of a target object detected by the echo signals as an actual trail data group;

storing relative changes in position of the target object detected by the echo signals with respect to a transmission origin location of the detection signals as a relative trail data group;

determining whether the target object detected with the detection signals is moving based on the actual trail data group; and displaying a relative trail of the target object along with the target object based on the relative trail data group, where displaying includes distinguishing a target object determined to be a moving target object from another target object having a substantially similar relative trail.

8. A computer-readable medium having embodied thereon an image processing program for causing a computer to execute processing, the processing comprising:

obtaining echo signals corresponding to detection signals transmitted while changing an azimuth direction of the transmission;

storing absolute changes in position of a target object detected by the echo signals in a memory as an actual trail data group;

storing relative changes in position of the target object detected by the echo signals with respect to a transmission origin location of the detection signals as a relative trail data group;

determining whether the target object detected with the detection signals is a moving target object based on the actual trail data group stored in the memory; and displaying a relative trail of the target object along with the target object based on the relative trail data group, where displaying includes distinguishing a target object determined to be a moving target object from another target object having a substantially similar relative trail.

* * * * *